United States Patent
Calley et al.

(10) Patent No.: US 7,851,965 B2
(45) Date of Patent: Dec. 14, 2010

(54) TRANSVERSE AND/OR COMMUTATED FLUX SYSTEM STATOR CONCEPTS

(75) Inventors: David G. Calley, Flagstaff, AZ (US); Thomas F. Janecek, Flagstaff, AZ (US)

(73) Assignee: Motor Excellence, LLC, Flagstaff, AZ (US)

( * ) Notice: Subject to any disclaimer, the term of this patent is extended or adjusted under 35 U.S.C. 154(b) by 0 days.

(21) Appl. No.: 12/611,728

(22) Filed: Nov. 3, 2009

(65) Prior Publication Data

US 2010/0109462 A1    May 6, 2010

Related U.S. Application Data

(60) Provisional application No. 61/110,874, filed on Nov. 3, 2008, provisional application No. 61/110,879, filed on Nov. 3, 2008, provisional application No. 61/110,884, filed on Nov. 3, 2008, provisional application No. 61/110,889, filed on Nov. 3, 2008, provisional application No. 61/114,881, filed on Nov. 14, 2008, provisional application No. 61/168,447, filed on Apr. 10, 2009.

(51) Int. Cl.
    *H02K 1/06*     (2006.01)
(52) U.S. Cl. .................. 310/216.033; 310/216.23; 310/181
(58) Field of Classification Search .......... 310/181, 310/190, 49.46, 49.52, 216.23, 216.33, 216.106, 310/245.1, 266–267
    See application file for complete search history.

(56) References Cited

U.S. PATENT DOCUMENTS

| | | | |
|---|---|---|---|
| 1,361,136 A | 12/1920 | Burke | |
| 2,078,668 A | 4/1937 | Kilgore | |
| 3,403,273 A | 9/1968 | Hiroshi | |
| 3,437,854 A | 4/1969 | Oiso | |
| 3,558,941 A | 1/1971 | Visconti Brebbia et al. | |

(Continued)

FOREIGN PATENT DOCUMENTS

DE    1513856    4/1969

(Continued)

OTHER PUBLICATIONS

Technical Project Presentation—Development of a High-Performance Generator for Wind Turbines—by Andrzej M. Trzynadlowski, PhD, University of Nevada, Reno, FIEEE, Aug. 2007.

(Continued)

*Primary Examiner*—Thanh Lam
(74) *Attorney, Agent, or Firm*—Snell & Wilmer L.L.P.

(57) ABSTRACT

Disclosed are transverse and/or commutated flux machines and components thereof, and methods of making and using the same. Certain exemplary stators for use in transverse and commutated flux machines may be configured with gaps therebetween, for example in order to counteract tolerance stackup. Other exemplary stators may be configured as partial stators having a limited number of magnets and/or flux concentrators thereon. Partial stators may facilitate ease of assembly and/or use with various rotors. Additionally, exemplary floating stators can allow a transverse and/or commutated flux machine to utilize an air gap independent of the diameter of a rotor. Via use of such exemplary stators, transverse and/or commutated flux machines can achieve improved performance, efficiency, and/or be sized or otherwise configured for various applications.

6 Claims, 15 Drawing Sheets

U.S. PATENT DOCUMENTS

| | | | |
|---|---|---|---|
| 3,700,942 A | 10/1972 | Alth | |
| 3,710,158 A | 1/1973 | Bachle et al. | |
| 3,774,059 A | 11/1973 | Cox | |
| 3,984,711 A * | 10/1976 | Kordik | 310/49.46 |
| 3,999,107 A * | 12/1976 | Reuting | 318/135 |
| 4,021,691 A | 5/1977 | Dukshtau et al. | |
| 4,114,057 A | 9/1978 | Esters | |
| 4,206,374 A | 6/1980 | Goddijn | |
| 4,237,396 A | 12/1980 | Blenkinsop et al. | |
| 4,255,684 A | 3/1981 | Mischler et al. | |
| 4,306,164 A * | 12/1981 | Itoh et al. | 310/49.32 |
| 4,363,988 A | 12/1982 | Kliman | |
| 4,388,545 A | 6/1983 | Honsinger et al. | |
| 4,392,072 A | 7/1983 | Rosenberry | |
| 4,459,501 A | 7/1984 | Fawzy | |
| 4,501,980 A | 2/1985 | Welburn | |
| 4,605,874 A | 8/1986 | Whiteley | |
| 4,611,139 A | 9/1986 | Godkin et al. | |
| 4,620,752 A | 11/1986 | Fremerey et al. | |
| 4,639,626 A * | 1/1987 | McGee | 310/155 |
| 4,658,166 A | 4/1987 | Oudet | |
| 4,794,286 A | 12/1988 | Taenzer | |
| 4,797,602 A | 1/1989 | West | |
| 4,835,840 A | 6/1989 | Stokes | |
| 4,850,100 A | 7/1989 | Stokes | |
| 4,899,072 A * | 2/1990 | Ohta | 310/49.46 |
| 4,900,965 A | 2/1990 | Fisher | |
| 4,959,577 A | 9/1990 | Radomski | |
| 5,038,066 A | 8/1991 | Pawlak et al. | |
| 5,051,641 A | 9/1991 | Weh | |
| 5,097,167 A | 3/1992 | Kanayama et al. | |
| 5,117,142 A | 5/1992 | von Zweygbergk | |
| 5,130,595 A | 7/1992 | Arora | |
| 5,132,581 A | 7/1992 | Kusase | |
| 5,177,054 A | 1/1993 | Lloyd | |
| 5,208,503 A | 5/1993 | Hisey | |
| 5,212,419 A | 5/1993 | Fisher et al. | |
| 5,214,333 A * | 5/1993 | Kawamura | 310/153 |
| 5,250,865 A | 10/1993 | Meeks | |
| 5,262,746 A | 11/1993 | Masuda | |
| 5,278,470 A | 1/1994 | Neag | |
| 5,289,072 A | 2/1994 | Lange | |
| 5,306,977 A | 4/1994 | Hayashi | |
| 5,382,859 A | 1/1995 | Huang et al. | |
| 5,386,166 A | 1/1995 | Reimer et al. | |
| 5,477,841 A * | 12/1995 | Trost et al. | 123/599 |
| 5,530,308 A | 6/1996 | Fanning et al. | |
| 5,543,674 A | 8/1996 | Koehler | |
| 5,543,677 A | 8/1996 | Fakler | |
| 5,633,551 A | 5/1997 | Weh | |
| 5,650,680 A | 7/1997 | Chula | |
| 5,712,521 A | 1/1998 | Detela | |
| 5,723,921 A * | 3/1998 | Sugiura | 310/49.19 |
| 5,729,065 A | 3/1998 | Fremery et al. | |
| 5,731,649 A | 3/1998 | Caamano | |
| 5,773,910 A | 6/1998 | Lange | |
| 5,777,418 A | 7/1998 | Lange et al. | |
| 5,780,953 A | 7/1998 | Umeda et al. | |
| 5,814,907 A | 9/1998 | Bandera | |
| 5,886,449 A | 3/1999 | Mitcham | |
| 5,889,348 A | 3/1999 | Muhlberger et al. | |
| 5,894,183 A | 4/1999 | Borchert | |
| 5,925,965 A | 7/1999 | Li et al. | |
| 5,942,828 A | 8/1999 | Hill | |
| 5,973,436 A | 10/1999 | Mitcham | |
| 5,994,802 A | 11/1999 | Shichijyo et al. | |
| 6,028,377 A | 2/2000 | Sakamoto | |
| 6,043,579 A | 3/2000 | Hill | |
| 6,060,810 A | 5/2000 | Lee et al. | |
| 6,066,906 A | 5/2000 | Kalsi | |
| 6,097,118 A * | 8/2000 | Hull | 310/74 |
| 6,097,126 A | 8/2000 | Takura | |
| 6,121,712 A | 9/2000 | Sakamoto | |
| 6,133,655 A | 10/2000 | Suzuki et al. | |
| 6,133,669 A | 10/2000 | Tupper | |
| 6,137,202 A | 10/2000 | Holmes et al. | |
| 6,154,013 A | 11/2000 | Caamano | |
| 6,163,097 A | 12/2000 | Smith et al. | |
| 6,177,748 B1 | 1/2001 | Katcher et al. | |
| 6,181,035 B1 | 1/2001 | Acquaviva | |
| 6,194,799 B1 | 2/2001 | Miekka et al. | |
| 6,229,238 B1 | 5/2001 | Graef | |
| 6,232,693 B1 | 5/2001 | Gierer et al. | |
| 6,236,131 B1 | 5/2001 | Schafer | |
| 6,246,561 B1 * | 6/2001 | Flynn | 361/147 |
| 6,300,702 B1 | 10/2001 | Jack et al. | |
| 6,342,746 B1 * | 1/2002 | Flynn | 310/181 |
| 6,365,999 B1 | 4/2002 | Muhlberger et al. | |
| 6,445,105 B1 | 9/2002 | Kliman et al. | |
| 6,448,687 B2 | 9/2002 | Higashino et al. | |
| 6,455,970 B1 | 9/2002 | Shafer et al. | |
| 6,472,792 B1 | 10/2002 | Jack et al. | |
| 6,492,758 B1 | 12/2002 | Gianni et al. | |
| 6,545,382 B1 | 4/2003 | Bennett | |
| 6,603,060 B1 | 8/2003 | Ohashi et al. | |
| 6,603,237 B1 | 8/2003 | Caamano | |
| 6,657,329 B2 | 12/2003 | Kastinger et al. | |
| 6,664,704 B2 | 12/2003 | Calley | |
| 6,707,208 B2 | 3/2004 | Durham et al. | |
| 6,717,297 B2 | 4/2004 | Sadarangani et al. | |
| 6,774,512 B2 | 8/2004 | Takagi et al. | |
| 6,791,225 B2 * | 9/2004 | Campbell et al. | 310/181 |
| 6,794,791 B2 | 9/2004 | Ben Ahmed et al. | |
| 6,815,863 B1 | 11/2004 | Jack et al. | |
| 6,849,985 B2 | 2/2005 | Jack et al. | |
| 6,853,112 B2 | 2/2005 | Nakamura et al. | |
| 6,867,530 B2 | 3/2005 | Gamm et al. | |
| 6,879,080 B2 | 4/2005 | Caamano | |
| 6,882,066 B2 * | 4/2005 | Kastinger | 310/49.08 |
| 6,885,129 B1 | 4/2005 | Oohashi et al. | |
| 6,924,579 B2 | 8/2005 | Calley | |
| 6,940,197 B2 | 9/2005 | Fujita et al. | |
| 6,949,855 B2 | 9/2005 | Dubois et al. | |
| 6,979,925 B2 | 12/2005 | Schwamm | |
| 6,989,622 B1 | 1/2006 | Chen et al. | |
| 7,015,603 B2 | 3/2006 | Barrho et al. | |
| 7,026,737 B2 | 4/2006 | Angerer et al. | |
| 7,030,529 B2 | 4/2006 | Dommsch et al. | |
| 7,030,534 B2 | 4/2006 | Caamano | |
| 7,064,469 B2 | 6/2006 | Jack et al. | |
| 7,067,954 B2 | 6/2006 | Kuribayashi et al. | |
| 7,071,593 B2 | 7/2006 | Matsushita et al. | |
| 7,126,313 B2 | 10/2006 | Dooley | |
| 7,129,602 B2 | 10/2006 | Lange et al. | |
| 7,135,802 B2 | 11/2006 | Seki et al. | |
| 7,208,856 B2 | 4/2007 | Imai et al. | |
| 7,211,922 B2 | 5/2007 | Isoda et al. | |
| 7,230,361 B2 | 6/2007 | Hirzel | |
| 7,245,055 B2 | 7/2007 | Jack | |
| 7,250,704 B1 | 7/2007 | Sortore et al. | |
| 7,358,639 B2 | 4/2008 | Caamano | |
| 7,385,329 B2 | 6/2008 | Hill | |
| 7,385,330 B2 | 6/2008 | Trzynadlowski et al. | |
| 7,420,312 B2 | 9/2008 | Kitamura et al. | |
| 7,466,057 B2 | 12/2008 | Imai et al. | |
| 7,592,735 B2 | 9/2009 | Hamada | |
| 7,602,095 B2 | 10/2009 | Kusase | |
| 2001/0001528 A1 | 5/2001 | Ragaly | |
| 2001/0030479 A1 | 10/2001 | Mohler | |
| 2001/0030486 A1 | 10/2001 | Pijanowski | |
| 2002/0070627 A1 | 6/2002 | Ward et al. | |
| 2002/0135242 A1 | 9/2002 | Kawai | |
| 2003/0122439 A1 | 7/2003 | Horst | |
| 2003/0122440 A1 | 7/2003 | Horst | |

| | | | |
|---|---|---|---|
| 2004/0061396 | A1 | 4/2004 | Narita et al. |
| 2004/0140730 | A1 | 7/2004 | Barrho et al. |
| 2004/0145269 | A1 | 7/2004 | Barrho et al. |
| 2004/0150288 | A1 | 8/2004 | Calley |
| 2004/0189138 | A1 | 9/2004 | Jack |
| 2004/0212267 | A1 | 10/2004 | Jack et al. |
| 2004/0232799 | A1 | 11/2004 | Chen et al. |
| 2004/0251759 | A1 | 12/2004 | Hirzel |
| 2004/0251761 | A1 | 12/2004 | Hirzel |
| 2004/0262105 | A1 | 12/2004 | Li et al. |
| 2005/0006978 | A1 | 1/2005 | Bradfield |
| 2005/0012427 | A1 | 1/2005 | Seki et al. |
| 2005/0062348 | A1 | 3/2005 | Ohnishi et al. |
| 2005/0121983 | A1 | 6/2005 | Ehrhart |
| 2005/0156479 | A1 | 7/2005 | Fujita et al. |
| 2005/0242679 | A1 | 11/2005 | Walter et al. |
| 2006/0012259 | A1 | 1/2006 | Kerlin |
| 2006/0012263 | A1 | 1/2006 | Smith et al. |
| 2006/0082237 | A1 | 4/2006 | Kerlin |
| 2006/0091755 | A1 | 5/2006 | Carlisle et al. |
| 2006/0131974 | A1 | 6/2006 | Sadarangani et al. |
| 2006/0131986 | A1 | 6/2006 | Hsu et al. |
| 2006/0192453 | A1 | 8/2006 | Gieras et al. |
| 2006/0220477 | A1 | 10/2006 | Okumoto et al. |
| 2006/0261688 | A1 | 11/2006 | Akita et al. |
| 2007/0013253 | A1 | 1/2007 | Dubois et al. |
| 2007/0046137 | A1 | 3/2007 | Ooiwa |
| 2007/0046139 | A1 | 3/2007 | Ishizuka |
| 2007/0075605 | A1 | 4/2007 | Enomoto et al. |
| 2007/0138900 | A1 | 6/2007 | Imai et al. |
| 2007/0152528 | A1 | 7/2007 | Kang et al. |
| 2007/0176505 | A1 | 8/2007 | Trzynadlowski et al. |
| 2008/0007126 | A1 | 1/2008 | Popov et al. |
| 2008/0169776 | A1 | 7/2008 | Acker |
| 2008/0211326 | A1 | 9/2008 | Kang et al. |
| 2008/0265707 | A1 | 10/2008 | Bradfield |
| 2008/0309188 | A1 | 12/2008 | Calley |
| 2008/0315700 | A1 | 12/2008 | Ishikawa et al. |
| 2009/0243406 | A1 | 10/2009 | Jack et al. |

FOREIGN PATENT DOCUMENTS

| | | |
|---|---|---|
| DE | 3626149 | 8/1986 |
| DE | 3602687 | 8/1987 |
| DE | 8711725 | 8/1987 |
| DE | 3927453 | 2/1991 |
| DE | 19634949 | 5/1998 |
| DE | 102006026719 | 6/2006 |
| EP | 0544200 | 11/1992 |
| EP | 0707374 | 4/1996 |
| EP | 0718959 | 6/1996 |
| EP | 0998010 | 3/2000 |
| EP | 1063754 | 12/2000 |
| EP | 1117168 | 7/2001 |
| EP | 1227566 | 7/2002 |
| GB | 518298 | 9/1938 |
| GB | 2052176 | 1/1986 |
| JP | 60241758 | 11/1985 |
| JP | 61042248 | 2/1986 |
| JP | 2001025197 | 1/2001 |
| KR | 10-2008-0061415 | 3/2008 |
| WO | WO 93/14551 | 7/1993 |
| WO | WO 99/34497 | 7/1999 |
| WO | WO 02/075895 | 9/2002 |
| WO | WO 2005/091475 | 9/2005 |
| WO | WO 2007024184 | 3/2007 |
| WO | WO 2009116935 | 9/2009 |
| WO | WO 2009116936 | 9/2009 |
| WO | WO 2009116937 | 9/2009 |

OTHER PUBLICATIONS

"Magnetic Field Calculation of Claw Pole Permanent Magnet Machines Using Magnetic Network Method": J. Elect. Electron. Eng., Australia, vol. 22, No. 1, pp. 69-75, 2002.

"Iron Loss Calculation in a Claw-Pole Structure", by A. Reinap et al., Lund University, Jun. 2004.

Dubois, Maxine R. et al.; "Clawpole Transverse-Flux Machine with Hybrid Stator"; pp. 1-6, Jul. 15, 2006.

Fundamental Modeling for Optimal Design of Transverse Flux Motors—Genevieve Patterson et al., University of Tokyo, 2008.

Raser Technologies Company Brochure, 2005.

ISR and WO dated Jun. 10, 2010 for International Application No. PCT/US2009/063145.

ISR and WO dated Jun. 10, 2010 for International Application No. PCT/US2009/063142.

ISR and WO dated Jun. 18, 2010 for International Application No. PCT/US2009/063147.

Office Action dated May 19, 2010 for U.S. Appl. No. 12/149,934.

Office Action dated Jul. 27, 2010 for U.S. Appl. No. 12/149,936.

Notice of Allowance dated Mar. 29, 2005 for U.S. Appl. No. 10/721,765.

Notice of Allowance dated Feb. 13, 2008 for U.S. Appl. No. 11/679,806.

Notice of Allowance dated May 30, 2003 for U.S. Appl. No. 10/273,238.

Notice of Allowance dated Nov. 3, 2009 for U.S. Appl. No. 12/149,931.

Notice of Allowance dated Dec. 30, 2009 for U.S. Appl. No. 12/149,931.

Office Action dated Sep. 28, 2007 for U.S. Appl. No. 11/679,806.

Office Action dated Nov. 30, 2009 for U.S. Appl. No. 12/149,935.

Office Action dated Sep. 13, 2004 for U.S. Appl. No. 10/721,765.

ISR/WO dated Aug. 15, 2008 for International Patent Application No. PCT/US2008/063301.

IPRP dated Nov. 10, 2009 for International Patent Application No. PCT/US2008/063301.

ISR/WO dated Aug. 20, 2008 for International Patent Application No. PCT/US2008/063236.

IPRP dated Nov. 17, 2009 for International Patent Application No. PCT/US2008/063236.

ISR/WO dated Oct. 24, 2008 for International Patent Application No. PCT/US2008/063336.

IPRP dated Nov. 17, 2009 for International Patent Application No. PCT/US2008/063336.

ISR/WO dated Aug. 15, 2008 for International Patent Application No. PCT/US2008/063287.

IPRP dated Nov. 10, 2009 for International Patent Application No. PCT/US2008/063287.

ISR/WO dated Nov. 10, 2009 for International Patent Application No. PCT/US2008/063268.

IPRP dated Nov. 10, 2009 for International Patent Application No. PCT/US2008/063268.

Technical Project Presentation—Development of a High-Performance Generator for Wind Turbines—Final Report—University of Nevada, Reno—Feb. 2004.

"Applications of Power Electronics in Automotive Power Generation",—by David J. Perreault et al., Laboratory for Electromagnetic and Electronic Systems, Massachusetts Institute of Technology, Jun. 21-22, 2006—Paris.

"Thermal Modeling of Lundell Alternators", IEEE Transactions on Energy Conversion, vol. 20, No. 1, Mar. 2005.

"Permanent Magnet Assisted Synchronous Reluctance Motor Design and Performance Improvement",—A Dissertation by Peyman Niazi, Texas A&M University, Dec. 2005.

"New Design of Hybrid-Type Self-Bearing Motor for Small, High-Speed Spindle",—by Hideki Kanebako et al., IEEE/ASME Transactions on Mechatronics, vol. 8, No. 1, Mar. 2003, retrieved Jan. 8, 2010.

"Evaluation of Rotor Conducting Screens on the Single-Phase Switched Reluctance Machine",—by M.M. Mahmoud et al., School of Engineering and Physical Sciences, Heriot-Watt University, Riccarton, Edinburgh, Scotland, United Kingdom, May 3, 2005.

"Analytical Interpretation and Quantification of Rotational Losses in Stator Cores of Induction Motors",—IEEE Transactions on Magnetics, vol. 43, No. 10, Oct. 2007, retrieved Jan. 8, 2010.

Hasubek, B.E. et al.; "Design Limitations of Reduced Magnet Material Passive Rotor Transverse Flux Motors Investigated Using 3D Finite Element Analysis"; 2000; pp. 365-369, retrieved Oct. 24, 2008.

Henneberger, G. et al.; "On the Parameters Computation of a Single Sided Transverse Flux Motor"; Workshop on Electrical Machines' Parameters, Technical University of Cluj-Napoca, May 26, 2001; pp. 35-40.

Woolmer, MD, T.J., et al., "Analysis of the Yokeless and Segmented Armature Machine", Electric Machines & Drives Conference, 2007. IEMDC apos; 07. IEEE International, May 3-5, 2007, pp. 704-708, vol. 1, Oxford University, Engineering Department, Parks Road, Oxford, UK.

Husband, S.M. et al.; "The Rolls-Royce Transverse Flux Motor Development"; Electric Machines and Drives Conference, vol. 3, pp. 1435-1440, IEEE, 2003.

Theory of SR Motor Operation (Power Point Presentation), copyright 2002 by George Holling and Rocky Mountain Technologies Inc.

Development of a PM Transverse Flux Motor With Soft Magnetic Composite Core—IEEE Transactions on Energy Conversion, vol. 21, No. 2., Jun. 2006.

www.higenmotor.com/eng/aboutus/about06read.asp?id=notice&no=87 dated Jan. 15, 2010.

Lyng Eltorque QT 800—2.0 User Manual, version 1.0—dated Jul. 3, 2007.

Motors: Emerging Concepts by George Holling, Apr. 2007.

www.iem.rwth-aachen.de/index.pl/new materials ans machines?makePrintable=1; retrieved Jan. 15, 2010.

Response to Office Action filed Jan. 15, 2010 for Japanese Patent Application No. JPPA-2003-548374.

Office Action dated Mar. 2, 2010 for U.S. Appl. No. 12/149,931.

Restriction Requirement dated Apr. 5, 2010 for U.S. Appl. No. 12/149,934.

Restriction Requirement dated Apr. 22, 2010 for U.S. Appl. No. 12/149,936.

Office Action dated Apr. 28, 2010 for U.S. Appl. No. 12/149,935.

Notice of Allowance dated May 4, 2010 for U.S. Appl. No. 12/149,931.

Office Action dated Aug. 9, 2010 for U.S. Appl. No. 12/611,733.

Notice of Allowance dated Aug. 19, 2010 for U.S. Appl. No. 12/611,737.

Notice of Allowance dated Sep. 8, 2010 for U.S. Appl. No. 12/149,934.

Notice of Allowance dated Oct. 6, 2010 for U.S. Appl. No. 12/149,935.

* cited by examiner

RADIAL GAP

AXIAL GAP

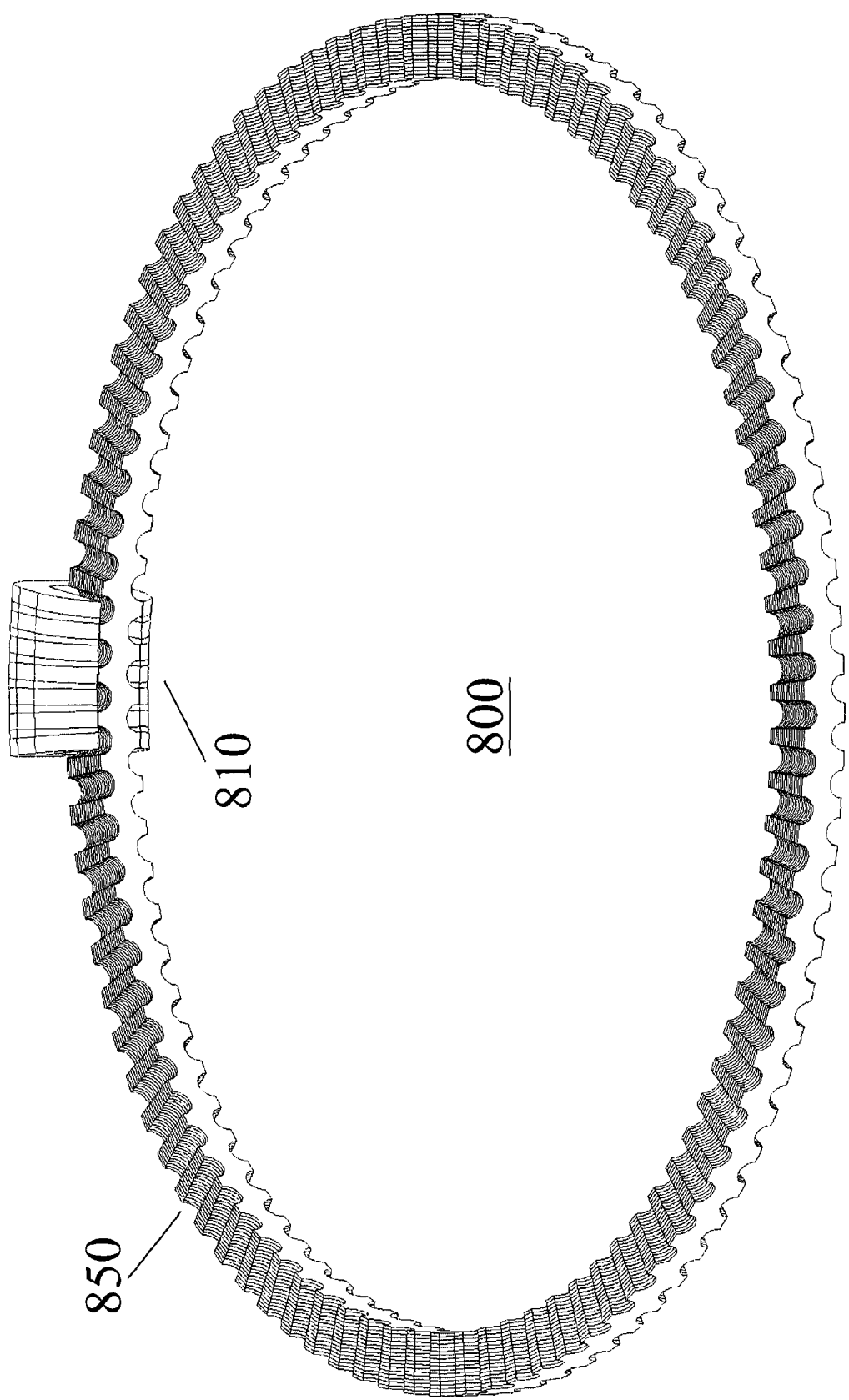

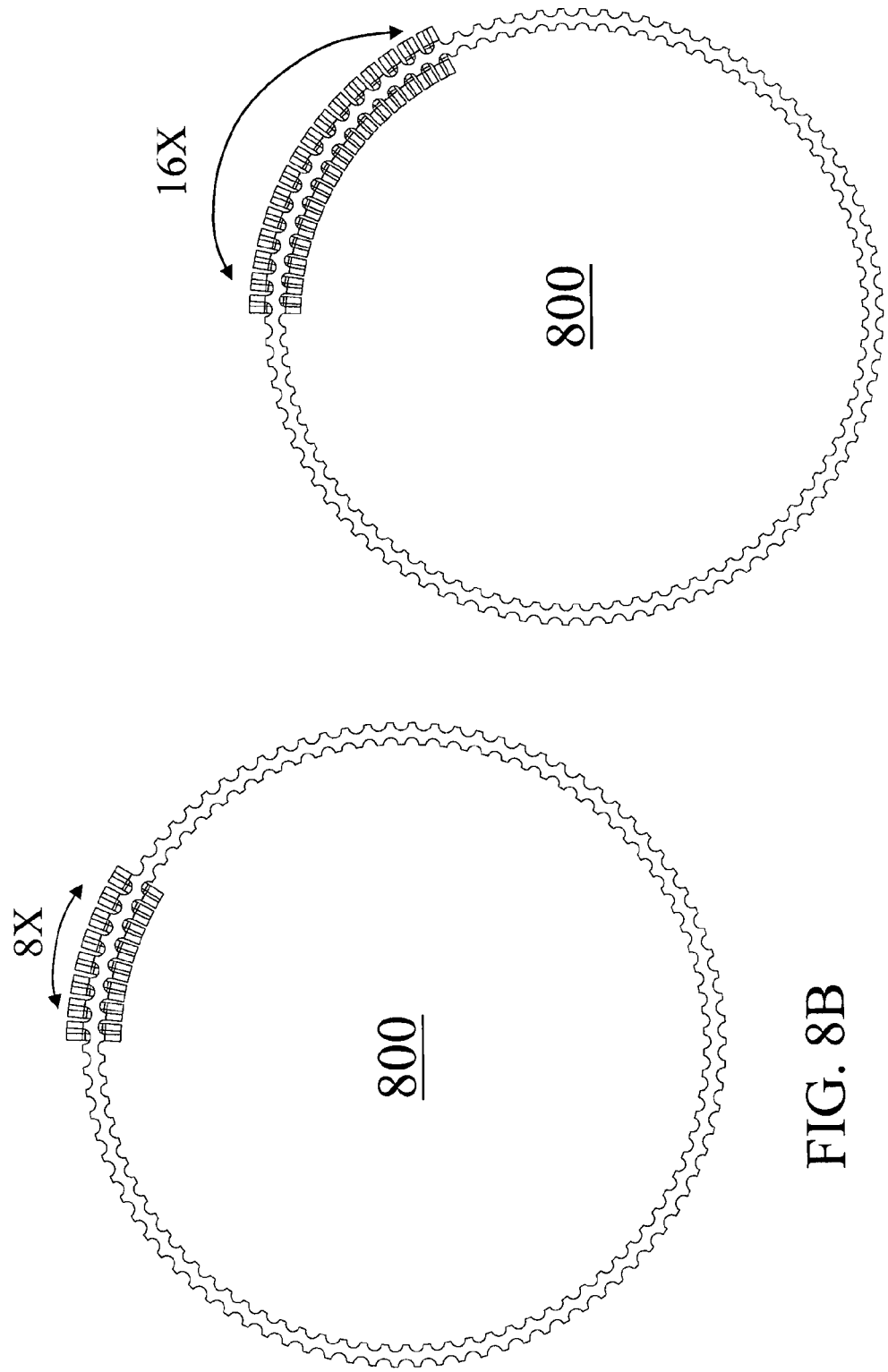

TRANSVERSE AND/OR COMMUTATED FLUX SYSTEM STATOR CONCEPTS

CROSS REFERENCE TO RELATED APPLICATIONS

This application is a non-provisional of U.S. Provisional No. 61/110,874 filed on Nov. 3, 2008 and entitled "ELECTRICAL OUTPUT GENERATING AND DRIVEN ELECTRICAL DEVICES USING COMMUTATED FLUX AND METHODS OF MAKING AND USE THEREOF INCLUDING DEVICES WITH TRUNCATED STATOR PORTIONS."

This application is also a non-provisional of U.S. Provisional No. 61/110,879 filed on Nov. 3, 2008 and entitled "ELECTRICAL OUTPUT GENERATING AND DRIVEN ELECTRICAL DEVICES USING COMMUTATED FLUX AND METHODS OF MAKING AND USE THEREOF."

This application is also a non-provisional of U.S. Provisional No. 61/110,884 filed on Nov. 3, 2008 and entitled "METHODS OF MACHINING AND USING AMORPHOUS METALS OR OTHER MAGNETICALLY CONDUCTIVE MATERIALS INCLUDING TAPE WOUND TORROID MATERIAL FOR VARIOUS ELECTROMAGNETIC APPLICATIONS."

This application is also a non-provisional of U.S. Provisional No. 61/110,889 filed on Nov. 3, 2008 and entitled "MULTI-PHASE ELECTRICAL OUTPUT GENERATING AND DRIVEN ELECTRICAL DEVICES WITH TAPE WOUND CORE LAMINATE ROTOR OR STATOR ELEMENTS, AND METHODS OF MAKING AND USE THEREOF."

This application is also a non-provisional of U.S. Provisional No. 61/114,881 filed on Nov. 14, 2008 and entitled "ELECTRICAL OUTPUT GENERATING AND DRIVEN ELECTRICAL DEVICES USING COMMUTATED FLUX AND METHODS OF MAKING AND USE THEREOF."

This application is also a non-provisional of U.S. Provisional No. 61/168,447 filed on Apr. 10, 2009 and entitled "MULTI-PHASE ELECTRICAL OUTPUT GENERATING AND DRIVEN ELECTRICAL DEVICES, AND METHODS OF MAKING AND USING THE SAME." The entire contents of all of the foregoing applications are hereby incorporated by reference.

TECHNICAL FIELD

The present disclosure relates to electrical systems, and in particular to transverse flux machines and commutated flux machines.

BACKGROUND

Motors and alternators are typically designed for high efficiency, high power density, and low cost. High power density in a motor or alternator may be achieved by operating at high rotational speed and therefore high electrical frequency. However, many applications require lower rotational speeds. A common solution to this is to use a gear reduction. Gear reduction reduces efficiency, adds complexity, adds weight, and adds space requirements. Additionally, gear reduction increases system costs and increases mechanical failure rates.

Additionally, if a high rotational speed is not desired, and gear reduction is undesirable, then a motor or alternator typically must have a large number of poles to provide a higher electrical frequency at a lower rotational speed. However, there is often a practical limit to the number of poles a particular motor or alternator can have, for example due to space limitations. Once the practical limit is reached, in order to achieve a desired power level the motor or alternator must be relatively large, and thus have a corresponding lower power density.

Moreover, existing multipole windings for alternators and electric motors typically require winding geometry and often complex winding machines in order to meet size and/or power needs. As the number of poles increases, the winding problem is typically made worse. Additionally, as pole count increases, coil losses also increase (for example, due to resistive effects in the copper wire or other material comprising the coil). However, greater numbers of poles have certain advantages, for example allowing a higher voltage constant per turn, providing higher torque density, and producing voltage at a higher frequency.

Most commonly, electric motors are of a radial flux type. To a far lesser extent, some electric motors are implemented as transverse flux machines and/or commutated flux machines. It is desirable to develop improved electric motor and/or alternator performance and/or configurability. In particular, improved transverse flux machines and/or commutated flux machines are desirable.

SUMMARY

This disclosure relates to transverse and/or commutated flux machines. In an exemplary embodiment, a commutated flux machine comprises a truncated stator having a plurality of magnets interleaved with a plurality of flux concentrators. The plurality of magnets has alternating magnetic orientations such that the plurality of flux concentrators has alternating magnetic poles. The plurality of magnets and the plurality of flux concentrators are coupled to less than the full circumference of a rotor.

In another exemplary embodiment, an electrical machine comprises a circular rotor and a truncated stator. The truncated stator may be coupled to the circular rotor such that the truncated stator extends only a portion of the circumference of the circular rotor. The electrical machine is at least one of a transverse flux machine or a commutated flux machine.

In yet another exemplary embodiment, an electrical machine comprises a rotor, a partial stator assembly, and a guide mechanism configured to achieve a specified air gap between the rotor and the partial stator assembly. The partial stator assembly has a flux concentrator, a first magnet connected to a first side of the flux concentrator, and a second magnet connected to a second side of the flux concentrator opposite the first side. The first magnet and the second magnet are magnetically oriented such that a common magnetic pole is present on the first and second sides of the flux concentrator. The electrical machine is at least one of a transverse flux machine or a commutated flux machine.

In another exemplary embodiment, a method of configuring an electrical machine comprises coupling a truncated stator to a rotor via a guide mechanism, and configuring the guide mechanism to achieve a desired air gap between the truncated stator and the rotor. The desired air gap is independent of the diameter of the rotor. The electrical machine is at least one of a transverse flux machine or a commutated flux machine.

In yet another exemplary embodiment, a method of configuring an electrical machine comprises coupling a truncated stator to a rotor via a guide mechanism, the rotor having a diameter, and configuring the guide mechanism to achieve a desired air gap between the truncated stator and the rotor. The desired air gap is independent of the diameter of the rotor. The electrical machine is at least one of a transverse flux machine or a commutated flux machine.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

FIGS. 8A-8C illustrate exemplary partial stators coupled to a rotor in accordance with an exemplary embodiment;

DETAILED DESCRIPTION

Figure 1B:
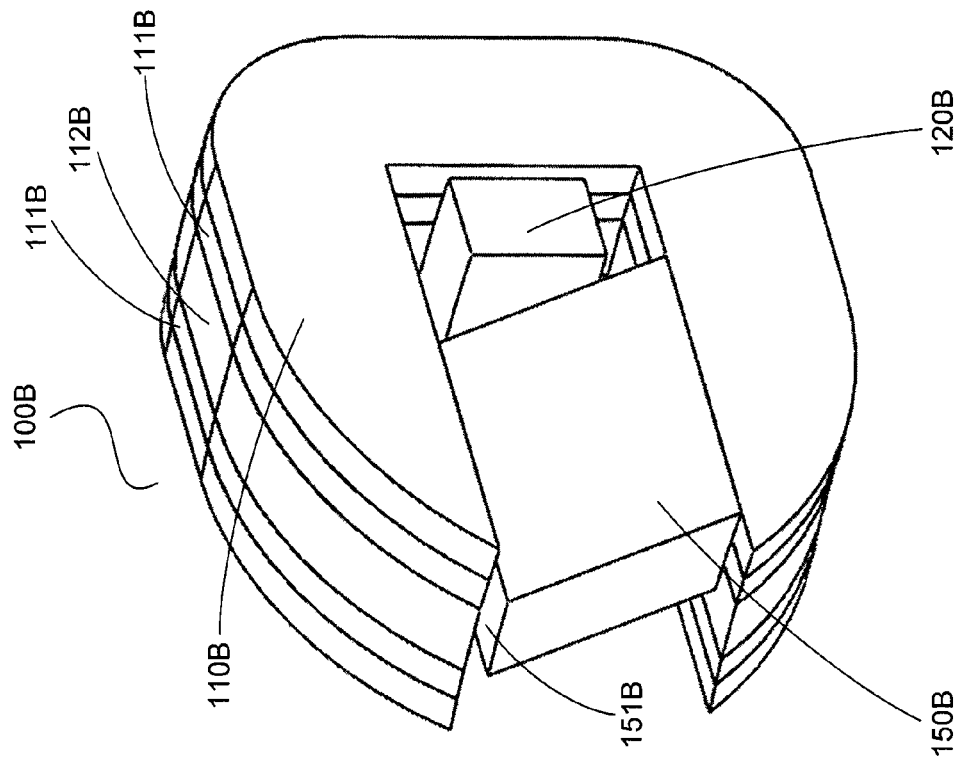
FIG. 1B illustrates an exemplary commutated flux machine in accordance with an exemplary embodiment.

While exemplary embodiments are described herein in sufficient detail to enable those skilled in the art to practice the invention, it should be understood that other embodiments may be realized and that logical electrical, magnetic, and/or mechanical changes may be made without departing from the spirit and scope of the present disclosure. Thus, the following descriptions are not intended as a limitation on the use or applicability of the present disclosure, but instead, are provided merely to enable a full and complete description of exemplary embodiments.

For the sake of brevity, conventional techniques for electrical system construction, management, operation, measurement, optimization, and/or control, as well as conventional techniques for magnetic flux utilization, concentration, control, and/or management, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical electrical system, for example an AC synchronous electric motor.

Prior electric motors, for example conventional DC brushless motors, suffer from various deficiencies. For example, many electric motors are inefficient at various rotational speeds and/or loads, for example low rotational speeds. Thus, the motor is typically operated within a narrow RPM range and/or load range of suitable efficiency. In these configurations, gears or other mechanical approaches may be required in order to obtain useful work from the motor.

Moreover, many electric motors have a low pole count. Because power is a function of torque and RPM, such motors must often be operated at a high physical RPM in order to achieve a desired power density and/or electrical frequency. Moreover, a higher power density (for example, a higher kilowatt output per kilogram of active electrical and magnetic motor mass) optionally is achieved by operating the motor at high rotational speed and therefore high electrical frequency. However, high electrical frequency can result in high core losses and hence lower efficiency. Moreover, high electrical frequency can result in increased cost, increased mechanical complexity, and/or decreased reliability. Additionally, high electrical frequency and associated losses create heat that may require active cooling, and can limit the operational range of the motor. Heat can also degrade the life and reliability of a high frequency machine.

Still other electric motors contain large volumes of copper wire or other coil material. Due to the length of the coil windings, resistive effects in the coil lead to coil losses. For example, such losses convert a portion of electrical energy into heat, reducing efficiency and potentially leading to thermal damage to and/or functional destruction of the motor.

Moreover, many prior electric motors offered low torque densities. As used herein, "torque density" refers to Newton-meters produced per kilogram of active electrical and magnetic materials. For example, many prior electric motors are configured with a torque density from about 0.5 Newton-meters per kilogram to about 3 Newton-meters per kilogram. Thus, a certain electric motor with a torque density of 1 Newton-meter per kilogram providing, for example, 10 total Newton-meters of torque may be quite heavy, for example in excess of 10 kilograms of active electrical and magnetic materials. Similarly, another electric motor with a torque density of 2 Newton-meters per kilogram providing, for example, 100 total Newton-meters of torque may also be quite heavy, for example in excess of 50 kilograms of active electrical and magnetic materials. As can be appreciated, the total weight of these electric motors, for example including weight of frame components, housings, and the like, may be significantly higher. Moreover, such prior electric motors are often quite bulky as a result of the large motor mass. Often, a motor of sufficient torque and/or power for a particular application is difficult or even impossible to fit in the available area.

Even prior transverse flux machines have been unable to overcome these difficulties. For example, prior transverse flux machines have suffered from significant flux leakage. Still others have offered torque densities of only a few Newton-meters per kilogram of active electrical and magnetic materials. Moreover, various prior transverse flux machines have been efficiently operable only within a comparatively narrow RPM and/or load range. Additionally, using prior transverse flux machines to generate substantial output power often required spinning relatively massive and complicated components (i.e., those involving permanent magnets and/or relatively exotic, dense and/or expensive flux concentrating or conducting materials) at high rates of speed. Such high-speed operation requires additional expensive and/or complicated components for support and/or system reliability.

Moreover, many prior transverse flux machines are comparatively expensive and/or difficult to manufacture, limiting their viability.

In contrast, various of these problems can be solved by utilizing transverse flux machines configured in accordance with principles of the present disclosure. As used herein, a "transverse flux machine" and/or "commutated flux machine" may be any electrical machine wherein magnetic flux paths have sections where the flux is generally transverse to a rotational plane of the machine. In an exemplary embodiment, when a magnet and/or flux concentrating components are on a rotor and/or are moved as the machine operates, the electrical machine may be a pure "transverse" flux machine. In another exemplary embodiment, when a magnet and/or flux concentrating components are on a stator and/or are held stationary as the machine operates, the electrical machine may be a pure "commutated" flux machine. As is readily apparent, in certain configurations a "transverse flux machine" may be considered to be a "commutated flux machine" by fixing the rotor and moving the stator, and vice versa. Moreover, a coil may be fixed to a stator; alternatively, a coil may be fixed to a rotor.

Moreover, there is a spectrum of functionality and device designs bridging the gap between a commutated flux machine and a transverse flux machine. Certain designs may rightly fall between these two categories, or be considered to belong to both simultaneously. Therefore, as will be apparent to one skilled in the art, in this disclosure a reference to a "transverse flux machine" may be equally applicable to a "commutated flux machine" and vice versa.

Moreover, transverse flux machines and/or commutated flux machines may be configured in multiple ways. For example, with reference to FIG. 2A, a commutated flux machine may be configured with a stator 210 generally aligned with the rotational plane of a rotor 250. Such a configuration is referred to herein as "axial gap." In another configuration, with reference to FIG. 2B, a commutated flux machine may be configured with stator 210 rotated about 90 degrees with respect to the rotational plane of rotor 250. Such a configuration is referred to herein as "radial gap."

Figure 3B:
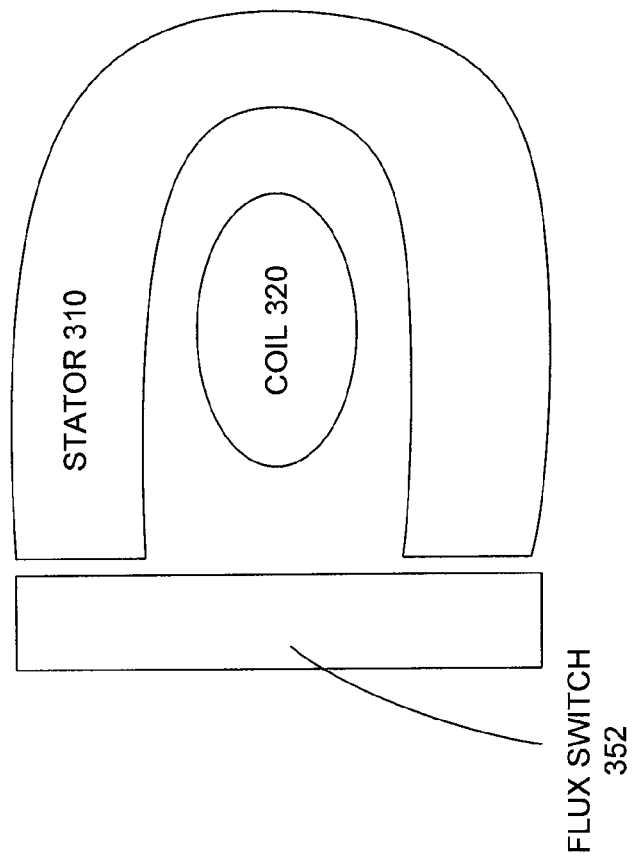
FIG. 3B illustrates an exemplary face engaged configuration in accordance with an exemplary embodiment.
Figure 3A:
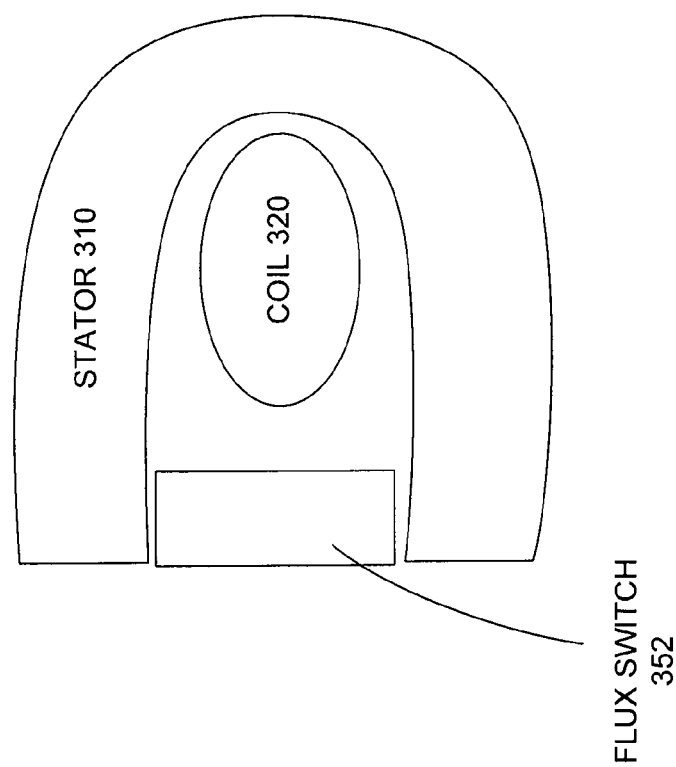
FIG. 3A illustrates an exemplary cavity engaged configuration in accordance with an exemplary embodiment.
Figure 3C:
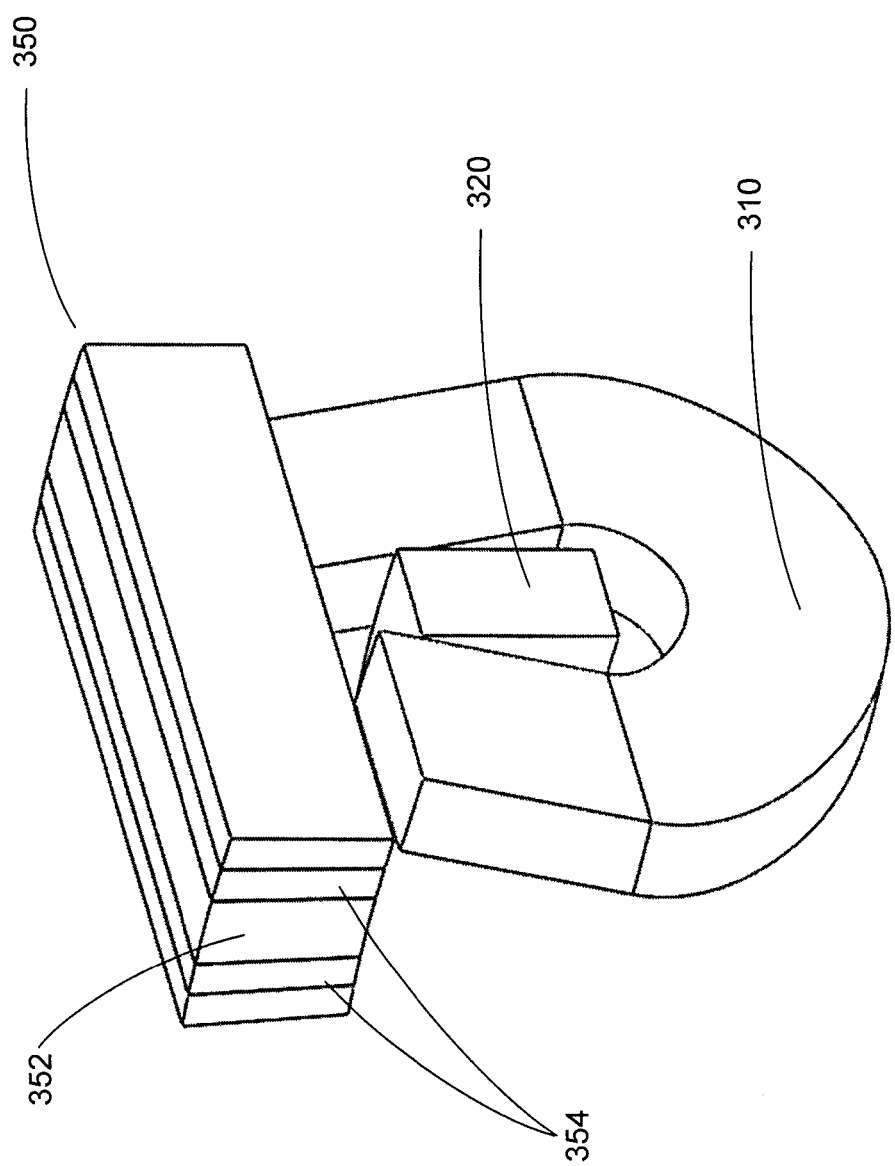
FIG. 3C illustrates an exemplary face engaged axial gap configuration in accordance with an exemplary embodiment.

With reference now to FIG. 3A, a flux switch 352 in a commutated flux machine may engage a stator 310 by extending at least partially into a cavity defined by stator 310. Such a configuration is referred to herein as "cavity engaged." Turning to FIG. 3B, flux switch 352 in a commutated flux machine may engage stator 310 by closely approaching two terminal faces of stator 310. Such a configuration is referred to herein as "face engaged." Similar engagement approaches may be followed in transverse flux machines and are referred to in a similar manner.

In general, a transverse flux machine and/or commutated flux machine comprises a rotor, a stator, and a coil. A flux switch may be located on the stator or the rotor. As used herein, a "flux switch" may be any component, mechanism, or device configured to open and/or close a magnetic circuit. (i.e., a portion where the permeability is significantly higher than air). A magnet may be located on the stator or the rotor. A coil is at least partially enclosed by the stator or the rotor. Optionally, flux concentrating portions may be included on the stator and/or the rotor. With momentary reference now to FIG. 1A, an exemplary transverse flux machine 100A may comprise a rotor 150A, a stator 110A, and a coil 120A. In this exemplary embodiment, a magnet may be located on rotor 150A. With momentary reference now to FIG. 1B, an exemplary commutated flux machine 100B may comprise a rotor 150B, a stator 110B, and a coil 120B. In this exemplary embodiment, a magnet may be located on stator 110B.

Moreover, a transverse flux machine and/or commutated flux machine may be configured with any suitable components, structures, and/or elements in order to provide desired electrical, magnetic, and/or physical properties. For example, a commutated flux machine having a continuous, thermally stable torque density in excess of 50 Newton-meters per kilogram may be achieved by utilizing a polyphase configuration. As used herein, "continuous, thermally stable torque density" refers to a torque density maintainable by a motor, without active cooling, during continuous operation over a period of one hour or more. Moreover, in general, a continuous, thermally stable torque density may be considered to be a torque density maintainable by a motor for an extended duration of continuous operation, for example one hour or more, without thermal performance degradation and/or damage.

Moreover, a transverse flux machine and/or commutated flux machine may be configured to achieve low core losses. By utilizing materials having high magnetic permeability, low coercivity, low hysteresis losses, low eddy current losses, and/or high electrical resistance, core losses may be reduced. For example, silicon steel, powdered metals, plated powdered metals, soft magnetic composites, amorphous metals, nanocrystalline composites, and/or the like may be utilized in rotors, stators, switches, and/or other flux conducting components of a transverse flux machine and/or commutated flux machine. Eddy currents, flux leakage, and other undesirable properties may thus be reduced.

A transverse flux machine and/or commutated flux machine may also be configured to achieve low core losses by varying the level of saturation in a flux conductor, such as in an alternating manner. For example, a flux conducting element in a stator may be configured such that a first portion of the flux conducting element saturates at a first time during operation of the stator. Similarly, a second portion of the same flux conducting element saturates at a second time during operation of the stator. In this manner, portions of the flux conducting element have a level of magnetic flux density significantly below the saturation induction from time to time, reducing core loss. For example, significant portions of the flux conducting element may have a level of flux density less than 25% of the saturation induction within the 50% of the time of its magnetic cycle. Moreover, any suitable flux density variations may be utilized.

Furthermore, a transverse flux machine and/or commutated flux machine may be configured to achieve low coil losses. For example, in contrast to a conventional electric motor utilizing a mass of copper C in one or more coils in order to achieve a desired output power P, a particular transverse flux machine and/or commutated flux machine may utilize only a small amount of copper C (for example, one-tenth as much copper C) while achieving the same output power P. Additionally, a transverse flux machine and/or commutated flux machine may be configured to utilize coil material in an improved manner (for example, by reducing and/or eliminating "end turns" in the coil). In this manner, resistive losses, eddy current losses, thermal losses, and/or other coil losses associated with a given coil mass C may be reduced. Moreover, within a transverse flux machine and/or commutated flux machine, a coil may be configured, shaped, oriented, aligned, manufactured, and/or otherwise configured to further reduce losses for a given coil mass C.

Additionally, in accordance with principles of the present disclosure, a transverse flux machine and/or commutated flux machine may be configured to achieve a higher voltage constant. In this manner, the number of turns in the machine may be reduced, in connection with a higher frequency. A corresponding reduction in coil mass and/or the number of turns in the coil may thus be achieved.

Yet further, in accordance with principles of the present disclosure, a transverse flux machine and/or commutated flux machine may be configured to achieve a high flux switching frequency, for example a flux switching frequency in excess of 1000 Hz. Because flux is switched at a high frequency, torque density may be increased.

Figure 4:
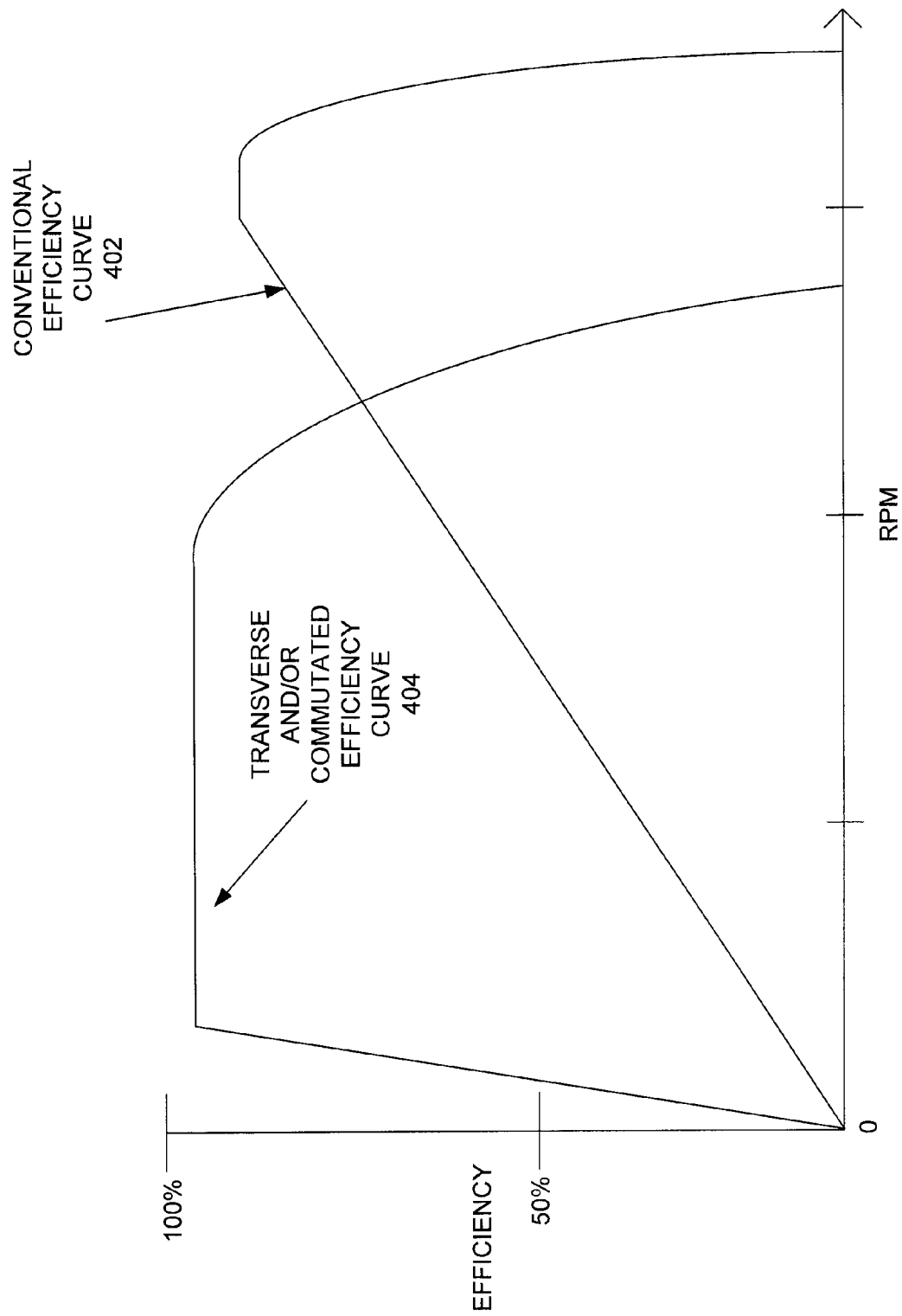
FIG. 4 illustrates various motor performance curves in accordance with an exemplary embodiment.

With reference now to FIG. 4, a typical conventional electric motor efficiency curve 402 for a particular torque is illustrated. Revolutions per minute (RPM) is illustrated on the X axis, and motor efficiency is illustrated on the Y axis. As illustrated, a conventional electric motor typically operates at a comparatively low efficiency at low RPM. For this conventional motor, efficiency increases and then peaks at a particular RPM, and eventually falls off as RPM increases further. As a result, many conventional electric motors are often desirably operated within an RPM range near peak efficiency. For example, one particular prior art electric motor may have a maximum efficiency of about 90% at about 3000 RPM, but the efficiency falls off dramatically at RPMs that are not much higher or lower.

Gearboxes, transmissions, and other mechanical mechanisms are often coupled to an electric motor to achieve a desired output RPM or other output condition. However, such mechanical components are often costly, bulky, heavy, and/or impose additional energy losses, for example frictional losses. Such mechanical components can reduce the overall efficiency of the motor/transmission system. For example, an electric motor operating at about 90% efficiency coupled to a gearbox operating at about 70% efficiency results in a motor/gearbox system having an overall efficiency of about 63%. Moreover, a gearbox may be larger and/or weigh more or cost more than the conventional electric motor itself. Gearboxes also reduce the overall reliability of the system.

In contrast, with continuing reference to FIG. 4 and in accordance with principles of the present disclosure, a transverse and/or commutated flux machine efficiency curve 404 for a particular torque is illustrated. In accordance with principles of the present disclosure, a transverse and/or commutated flux machine may rapidly reach a desirable efficiency level (for example, 80% efficiency or higher) at an RPM lower than that of a conventional electric motor. Moreover, the transverse and/or commutated flux machine may maintain a desirable efficiency level across a larger RPM range than that of a conventional electric motor. Additionally, the efficiency of the transverse and/or commutated flux machine may fall off more slowly past peak efficiency RPM as compared to a conventional electric motor.

Furthermore, in accordance with principles of the present disclosure, a transverse and/or commutated flux machine may achieve a torque density higher than that of a conventional electric motor. For example, in an exemplary embodiment a transverse and/or commutated flux machine may achieve a continuous, thermally stable torque density in excess of 100 Newton-meters per kilogram.

Thus, in accordance with principles of the present disclosure, a transverse and/or commutated flux machine may desirably be employed in various applications. For example, in an automotive application, a transverse and/or commutated flux machine may be utilized as a wheel hub motor, as a direct driveline motor, and/or the like. Moreover, in an exemplary embodiment having a sufficiently wide operational RPM range, particularly at lower RPMs, a transverse and/or commutated flux machine may be utilized in an automotive application without need for a transmission, gearbox, and/or similar mechanical components.

An exemplary electric or hybrid vehicle embodiment comprises a transverse flux motor for driving a wheel of the vehicle, wherein the vehicle does not comprise a transmission, gearbox, and/or similar mechanical component(s). In this exemplary embodiment, the electric or hybrid vehicle is significantly lighter than a similar vehicle that comprises a transmission-like mechanical component. The reduced weight may facilitate an extended driving range as compared to a similar vehicle with a transmission like mechanical component. Alternatively, weight saved by elimination of the gearbox allows for utilization of additional batteries for extended range. Moreover, weight saved by elimination of the gearbox allows for additional structural material for improved occupant safety. In general, a commutated flux machine having a broad RPM range of suitable efficiency may desirably be utilized in a variety of applications where a direct-drive configuration is advantageous. For example, a commutated flux machine having an efficiency greater than 80% over an RPM range from only a few RPMs to about 2000 RPMs may be desirably employed in an automobile.

Moreover, the exemplary transmissionless electric or hybrid vehicle may have a higher overall efficiency. Stated otherwise, the exemplary vehicle may more efficiently utilize the power available in the batteries due to the improved efficiency resulting from the absence of a transmission-like component between the motor and the wheel of the vehicle. This, too, is configured to extend driving range and/or reduce the need for batteries.

Additionally, the commutated flux machine is configured to have a high torque density. In accordance with principles of the present disclosure, the high torque density commutated flux machine is also well suited for use in various applications, for example automotive applications. For example, a conventional electric motor may have a torque density of between about 0.5 to about 3 Newton-meters per kilogram. Additional techniques, for example active cooling, can enable a conventional electric motor to achieve a torque density of up to about 50 Newton-meters per kilogram. However, such techniques typically add significant additional system mass, complexity, bulk, and/or cost. Additionally, such conventional electric motors configured to produce comparatively high amounts of torque, for example the Siemens 1FW6 motor, are limited to comparatively low RPM operation, for example operation below 250 RPMs.

In contrast, in accordance with principles of the present disclosure, an exemplary passively cooled transverse flux machine and/or commutated flux machine may be configured with a continuous, thermally stable torque density in excess of 50 Newton-meters per kilogram. As used herein, "passively cooled" is generally understood to refer to systems without cooling components requiring power for operation, for example water pumps, oil pumps, cooling fans, and/or the like. Moreover, this exemplary transverse flux machine and/or commutated flux machine may be configured with a compact diameter, for example a diameter less than 14 inches. Another exemplary transverse flux machine and/or commutated flux machine may be configured with a continuous, thermally stable torque density in excess of 100 Newton-meters per kilogram and a diameter less than 20 inches. Accordingly, by utilizing various principles of the present disclosure, exemplary transverse flux machines and/or commutated flux machines may be sized and/or otherwise configured and/or shaped in a manner suitable for mounting as a wheel hub motor in an electric vehicle, because the transverse flux machine and/or commutated flux machine is significantly lighter and/or more compact than a conventional electric motor. In this manner, the unsprung weight of the resulting wheel/motor assembly can be reduced. This can improve vehicle handling and reduce the complexity and/or size of suspension components.

Further, in accordance with principles of the present disclosure, a transverse flux machine and/or commutated flux machine may desirably be utilized in an electromechanical system having a rotating portion, for example a washing machine or other appliance. In one example, a conventional washing machine typically utilizes an electric motor coupled to a belt drive to spin the washer drum. In contrast, a transverse flux machine and/or commutated flux machine may be axially coupled to the washer drum, providing a direct drive configuration and eliminating the belt drive element. Alternatively, a transverse flux machine and/or commutated flux machine, for example one comprising a partial stator, may be coupled to a rotor. The rotor may have a common axis as the washer drum. The rotor may also be coupled directly to the washer drum and/or integrally formed therefrom. In this manner, a transverse flux machine and/or commutated flux machine may provide rotational force for a washing machine or other similar electromechanical structures and/or systems.

Moreover, in accordance with principles of the present disclosure, a transverse flux machine and/or commutated flux machine may desirably be utilized to provide mechanical output to relatively lightweight vehicles such as bicycles, scooters, motorcycles, quads, golf carts, or other vehicles. Additionally, a transverse flux machine and/or commutated flux machine may desirably be utilized in small engine applications, for example portable generators, power tools, and other electrical equipment. A transverse flux machine and/or commutated flux machine may desirably be utilized to provide mechanical output to propeller-driven devices, for example boats, airplanes, and/or the like. A transverse flux machine and/or commutated flux machine may also desirably be utilized in various machine tools, for example rotating spindles, tables configured to move large masses, and/or the like. In general, transverse flux machines and/or commutated flux machines may be utilized to provide electrical and/or mechanical input and/or output to and/or from any suitable devices.

An electrical system, for example an electric motor, may be any system configured to facilitate the switching of magnetic flux. In accordance with an exemplary embodiment and with reference again to FIG. 1A, an electrical system, for example transverse flux machine 100A, generally comprises a rotor portion 150A, a stator portion 110A, and a coil 120A. Rotor portion 150A is configured to interact with stator portion 110A in order to facilitate switching of magnetic flux. Stator portion 110A is configured to be magnetically coupled to rotor portion 150A, and is configured to facilitate flow of magnetic flux via interaction with rotor portion 150A. Coil 120A is configured to generate an output responsive to flux switching and/or accept a current input configured to drive the rotor. Transverse flux machine 100A may also comprise various structural components, for example components configured to facilitate operation of transverse flux machine 100A. Moreover, transverse flux machine 100A may comprise any suitable components configured to support, guide, modify, and/or otherwise manage and/or control operation of transverse flux machine 100A and/or components thereof.

Figure 1A:
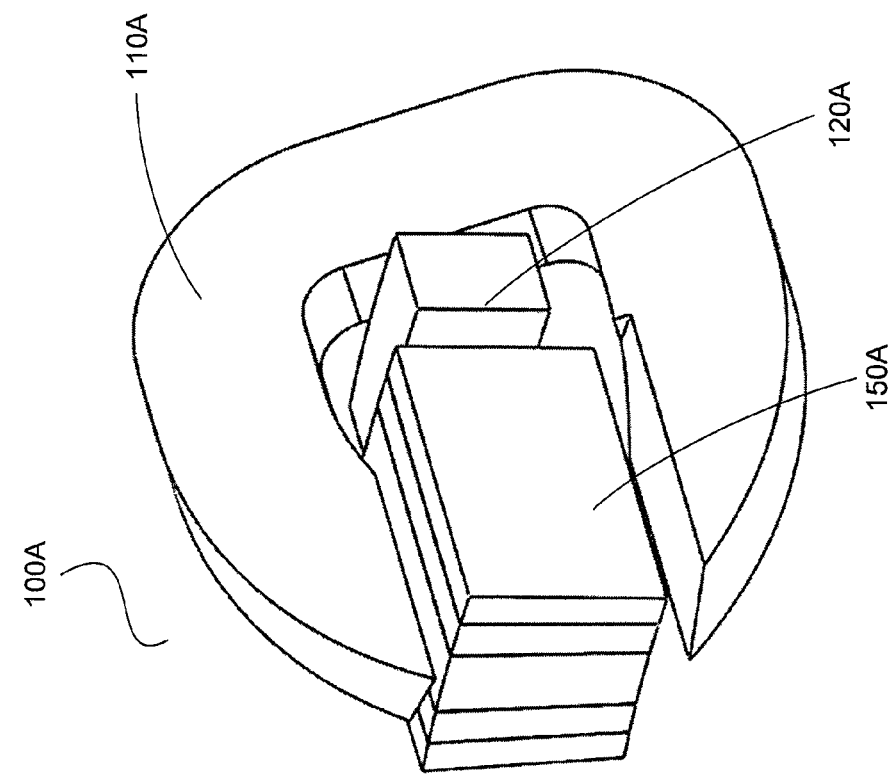
FIG. 1A illustrates an exemplary transverse flux machine in accordance with an exemplary embodiment.

In accordance with an exemplary embodiment and with renewed reference to FIG. 1B, a commutated flux machine (CFM) system 100B comprises a stator 110 (for example, stator 110B), a rotor 150 (for example, rotor 150B), and a coil 120 (for example, coil 120B). In various embodiments, CFM system 100B has a generally circumferential stator which comprises multiple magnets 111B and flux concentrators 112B to form a complete circle. In an exemplary embodiment, stator 110B partially encloses coil 120B. Furthermore, rotor 150B has passive switching elements 151B, and rotates to interact with stator 110B and switch magnetic flux.

In an exemplary embodiment of the circumferential stator 110B, magnets 111B and flux concentrators 112B are arranged in alternating fashion. In one exemplary embodiment, magnets 111B are magnetically oriented in alternating directions while interleaving with flux concentrators 112B. Stated another way, magnets 111B may be arranged so that a north magnetic side of a particular magnet 111B is facing a north magnetic side of another magnet 111B, with a flux concentrator 112B therebetween. Likewise, a south magnetic side may be oriented facing another south magnetic side, separated by a flux concentrator 112B. The interleaving and alternating directions result in each flux concentrator 112B having a net magnetic pole.

Figure 5:
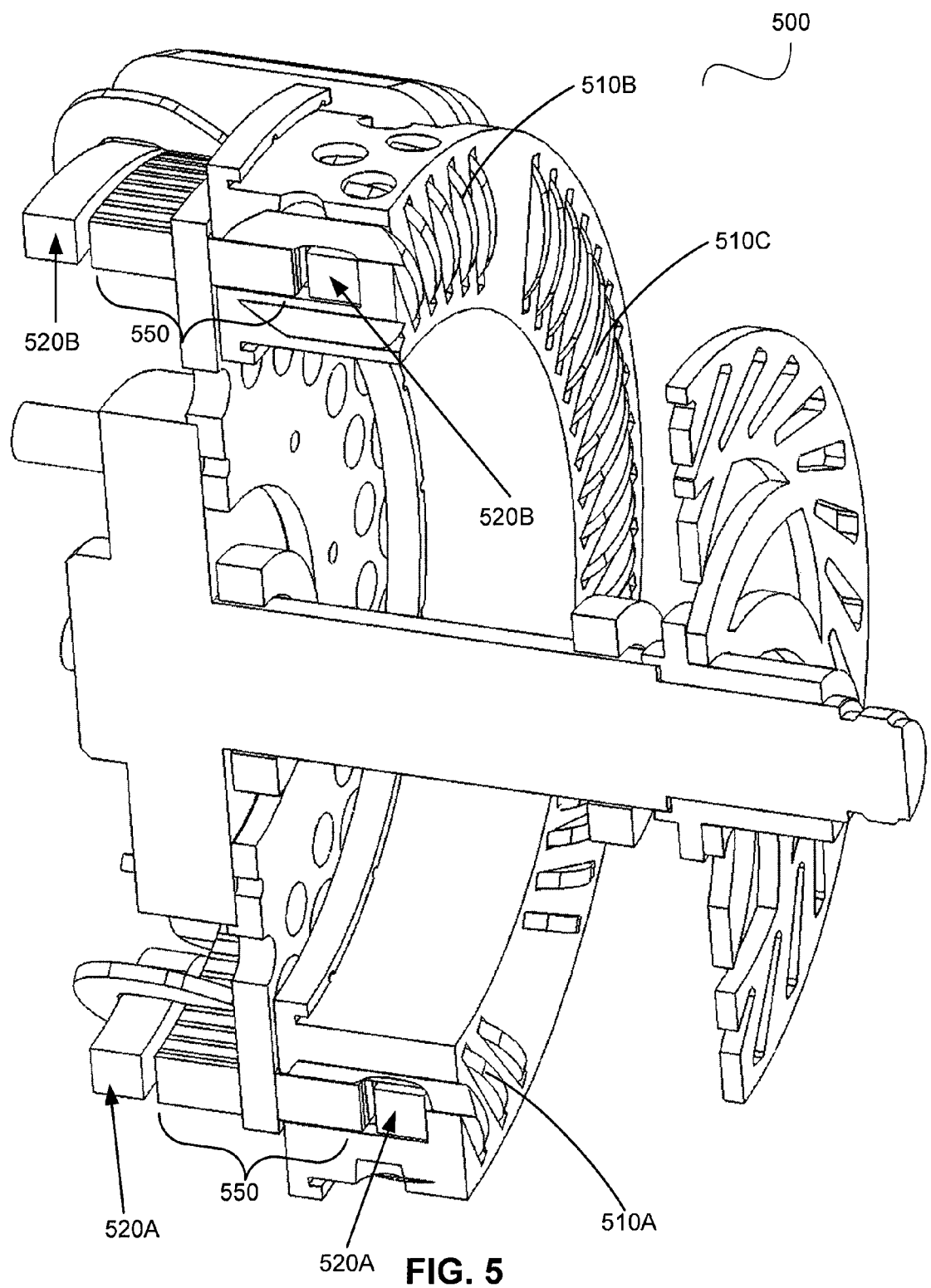
FIG. 5 illustrates, in a cut-away view, an exemplary transverse flux machine configured for use in a vehicle in accordance with an exemplary embodiment.

In an exemplary embodiment, and with reference now to FIG. 5, a transverse and/or commutated flux machine may be implemented with multiple partial stators, for example as a wheel hub motor. For example, a transverse flux machine 500 may comprise a rotor 550, one or more coils 520 (shown as 520A and 520B), and one or more partial stators 510 (shown as 510A, 510B, and 510C). Moreover, via use of a plurality of partial stators, transverse flux machine 500 may be configured to produce polyphase output and/or operate responsive to polyphase input, for example when each of the plurality of partial stators correspond to a different phase.

Figure 6:
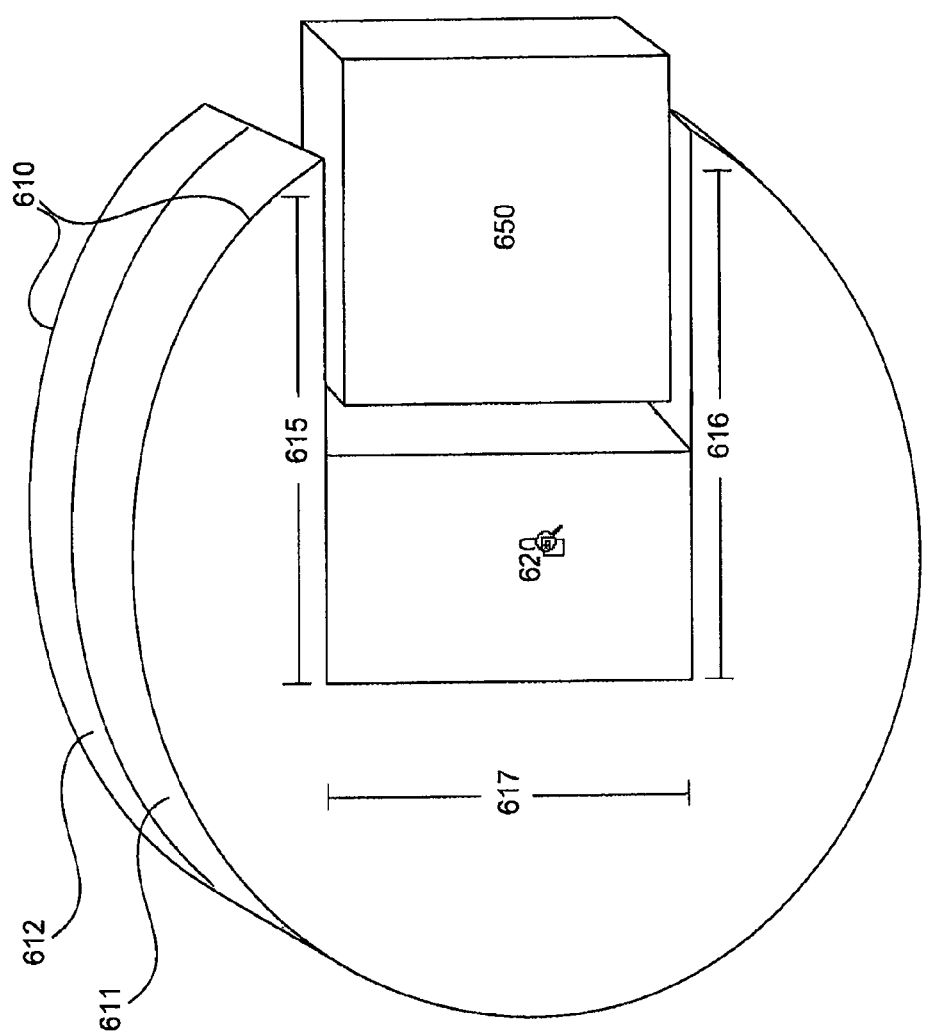
FIG. 6 illustrates a side perspective view of an exemplary commutated flux machine section in accordance with an exemplary embodiment.

With reference now to FIG. 6, in an exemplary embodiment a CFM stator unit 610 comprises a flux concentrator 612 and a magnet 611 that are both substantially C-shaped. The C-shaped components 611, 612 can be defined as having a first leg 615, a second leg 616, and a return portion 617 that connects to the first and second legs 615, 616. In an exemplary embodiment, CFM stator unit 610 is generally C-shaped to accommodate a substantially annular or doughnut shaped rotor portion 650 in a cavity engaged configuration. In another exemplary embodiment, CFM stator unit 610 is configured to be face engaged with rotor portion 650. Furthermore, in addition to C-shaped, in exemplary embodiments the shapes of the stator components may be U-shaped, rectangular, triangular, rounded cross-sectional shapes, and/or any other suitable shapes known to one skilled in the art.

In an exemplary embodiment, a stator further comprises a structural support that holds the magnets and flux concentrators for assembly and/or spacing. The structural support is designed to not interfere with the motion of the CFM system. In another exemplary embodiment, the stator further comprises cooling devices. The cooling devices may include radiative portions, conductive cooling portions, and/or the like. In yet another exemplary embodiment, the stator may also comprise components that measure certain characteristics of the device, such as Hall effect sensors and/or the like. Furthermore, in various exemplary embodiments the stator comprises components configured to drive the rotor.

With reference again to FIG. 6, CFM stator unit 610 may at least partially enclose a coil 620. Coil 620 may be any suitable height, width, and/or length to generate an electrical current responsive to flux switching in the stator. Coil 620 may also be any suitable height, width, and/or length configured to transfer a current to drive the rotor. In an embodiment, coil 620 is circular about an axis of rotation. In various exemplary embodiments, coil 620 has a diameter of between approximately 2 inches and approximately 36 inches in the plane of rotation. Moreover, coil 620 may have any suitable diameter, length, and/or other dimensions and/or geometries, as desired.

In an exemplary embodiment, coil 620 is coupled to an interior surface of concentrator 611. Moreover, in another exemplary embodiment, concentrator 611 is "wrapped" around coil 620 so that the interior surface of concentrator 611 is slightly larger than the height and width of coil 620 with as little as gap as possible. Coil 620 may also be desirably spaced away from and/or magnetically insulated from rotor switch 650, for example in order to reduce eddy currents and/or other induced effects in coil 620 responsive to flux switching near the surface of rotor switch 650.

In an exemplary embodiment, coil 620 is electrically coupled to a current source. The current source may be any suitable current source, but in one exemplary embodiment the current source is alternating power. It should be noted that coil 620 could be connected to be a source in general applications.

In an exemplary embodiment, coil 620 is generally constructed from copper. However, coil 620 may be made out of any suitable electrically conductive material and/or materials such as copper, silver, gold, aluminum, superconducting materials, and/or the like. In an exemplary embodiment, coil 620 is a loop. The loop is in contrast to windings, which may have greater losses than a single loop. Furthermore, coil 620 may be one solid piece, or may be made by coiling, layering, stacking, and/or otherwise joining many smaller strands or wires of electrically conductive material and/or low-loss materials together.

In accordance with an exemplary embodiment, the stator and rotor interact to create a magnetic flux circuit. Flux conduction is created, for example, by the switching elements of the rotor bridging the gap between opposite pole flux concentrators. In an exemplary embodiment, opposite pole flux concentrators are adjacent in the stator. In various exemplary embodiments, a flux path is created through the switching elements of the rotor. In another exemplary embodiment, a flux path is created through a magnet separating the adjacent flux concentrators. In an exemplary embodiment, AC synchronous flux flow is generated in response to similar flux conduction and flux paths being created simultaneously in adjacent flux concentrators. In another exemplary embodiment, asynchronous flux flow is generated in response to flux conduction and flux paths being created in adjacent flux concentrators at slightly delayed intervals.

In an exemplary generator embodiment, as the rotor moves into new position relative to the stator, flux flows in an opposite direction within the stator as compared to a prior position of the rotor. The change in flux direction causes the flux to be conducted around the coil in alternating directions. The alternating flux direction results in generation of alternating electrical output in the coil.

In an exemplary motor embodiment, the rotor is driven to rotate. The rotor movement is controlled, in an exemplary embodiment, by a control system which controls, for example, rotor RPM, axial positioning, acceleration, rotational direction, deceleration, starting, and/or stopping. In an exemplary embodiment, the rotor is driven in either direction (clockwise or counterclockwise), for example depending on a preference of an operator. The control system may further comprise programming memory, and a user interface, which may include graphics. The control system may include ports for coupling to additional electrical devices and/or may be coupled to additional electrical devices wirelessly. The control system may further comprise sensors for monitoring and measuring desired values of the system. These values may include one or more of phase matching, phase propagation, output waveforms, flux density, voltage constant, torque constant, webers of flux switched, RPM, system malfunctions, and/or the like. A power source may be coupled to the control system. This power source may be any suitable power source for operation of the control system, such as alternating current, direct current, capacitive charge, and/or inductance. In an exemplary embodiment, the power source is a DC battery.

Portions of rotor and/or stator elements may comprise any suitable flux conducting material and/or materials, such as steel, silicon steel, amorphous metals, metallic glass alloys, nanocrystalline composite, and powdered metals such as powdered iron.

In an exemplary embodiment, portions of a commutated and/or transverse flux machine, for example CFM system 100B, such as portions of the stator 110B or rotor 150B may be comprised of Metglas® brand amorphous metal products produced by Hitachi Metals America, for example Metglas® brand magnetic alloy 2605SA1 and/or the like. In general, such magnetic alloys have excellent flux conducing properties (e.g., permeability, for example, may be up to hundreds of thousands of times the permeability of silicon steel). Such magnetic alloys are also resistant to the effects of heat and losses), such as may occur with high speed operation of devices in accordance with aspects of the present disclosure. For example, losses for devices using such magnetic alloys, compared to using silicon steel, may be reduced from about 800 watts to about 30 watts or less, in some exemplary applications. Moreover, utilization of such magnetic alloys can allow for higher speed operation without the need for auxiliary cooling. For example, a device using magnetic alloy in place of silicon steel may be configured to achieve a continuous operation at a higher RPM, for example an RPM two times greater, five times greater, ten times greater, or even more. These features, in addition to other factors, allow the power to weight ratios of exemplary transverse and/or commutated flux devices to increase.

In certain exemplary embodiments, portions of CFM system 100B, such as portions of stator 110B or rotor 150B, may be comprised of stacked laminated steel. The orientation of the laminations may be varied to enhance flux transmission. For instance, certain laminations may be oriented in a radial direction. This approach may enhance mechanical strength and/or ease assembly. Alternatively, such as for a return portion in a flux conducting element of a stator, the surfaces of the laminations may be oriented parallel to the direction of flux transmission, thereby reducing eddy currents and/or other losses. Minimizing eddy current effects and/or otherwise enhancing flux transmission can be achieved using powdered iron; however, powdered iron generally does not conduct magnetic flux as efficiently as, for example, steel laminate (or other flux conducting material, such as Metglas® 2605SA1) and does not include the physical layer features potentially useful in minimizing or otherwise addressing eddy current and other losses. In addition, the use of powdered iron has the further drawback of increased hysteresis losses.

In an exemplary embodiment, portions of CFM system 100B, such as portions of the stator magnets, may comprise rare earth permanent magnets. Magnetic material may comprise any suitable material, for example neodymium-iron-boron (NIB) material. In an exemplary embodiment, the rare earth permanent magnets have a suitable magnetic field, for example a field in the range of 0.5 to 2.5 Tesla. In other exemplary embodiments, the stator magnets comprise inducted magnets and/or electromagnets. The inducted magnets and/or electromagnets may be made out of iron, iron alloys, metallic alloys, and/or the like, as well as other suitable materials as is known.

In an exemplary embodiment, a flux concentrator gathers the flux from one or more coupled magnets. A flux concentrator is typically made of some form of iron, such as silicon steel, powdered metals, amorphous metals, metallic glass alloys, nanocrystalline composite, and/or the like. Furthermore, in various exemplary embodiments, the flux concentrator may be made out of any suitable material, for example a material with a high permeability, high flux saturation, and/or high electrical resistance.

In addition to a circumferential CFM system as described, various other configurations of a CFM stator may be utilized. These other configurations include, but are not limited to, a gapped stator, a partial stator, and a floating stator.

Figure 7:
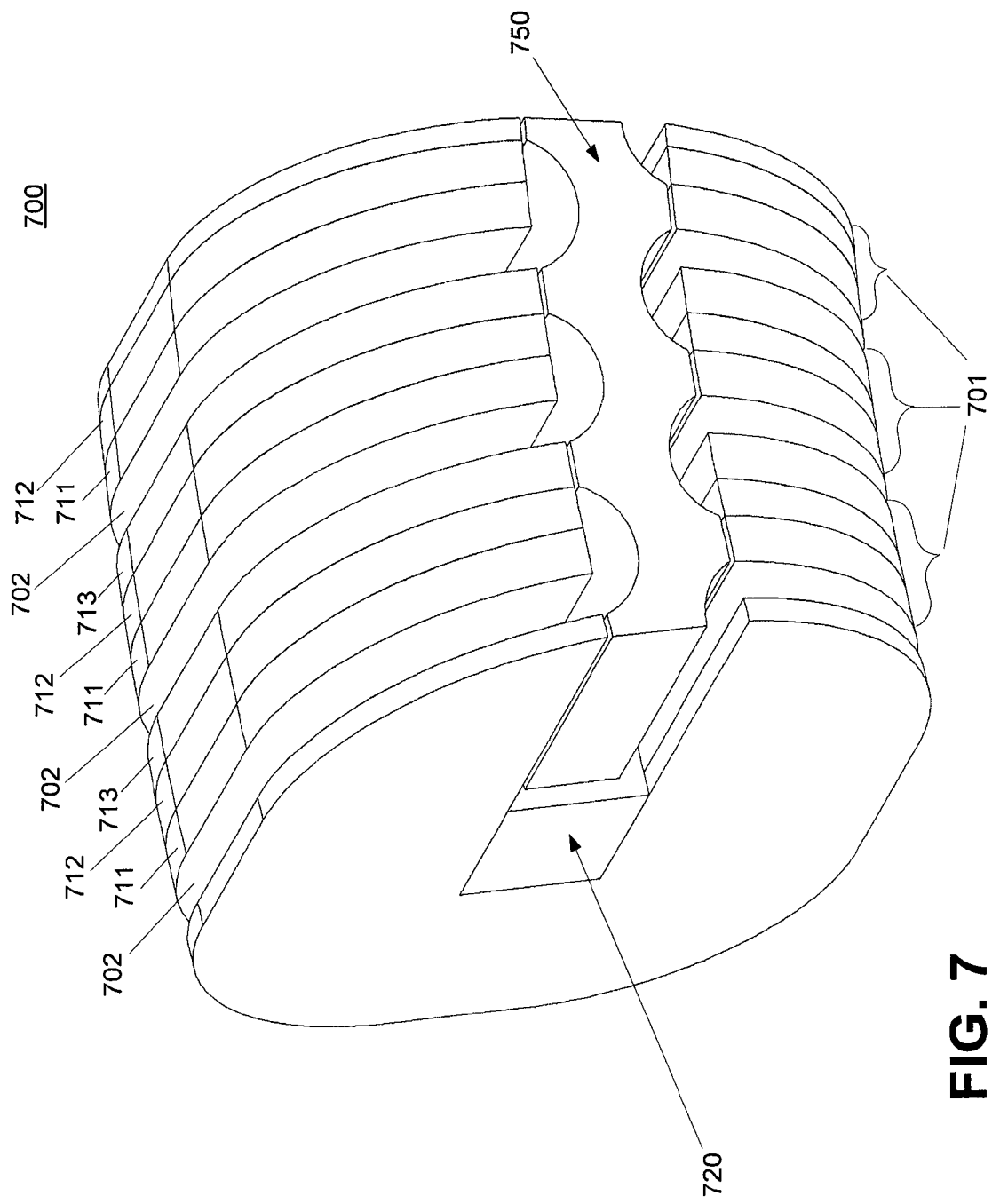
FIG. 7 illustrates a perspective view of an exemplary gapped stator coupled with an exemplary rotor and coil in accordance with an exemplary embodiment.

In an exemplary embodiment and with reference now to FIG. 7, a gapped stator CFM system 700 comprises multiple commutated flux stator sections 701 assembled generally about the circumference of a coil 720 and a rotor 750. The gapped stator CRM system 700 further comprises a gap 702 between each of the multiple commutated flux stator sections 701. Furthermore, in an exemplary embodiment, a structural support (not shown) is located in gap 702 of gapped stator system 700.

In accordance with an exemplary embodiment, gapped stator CFM system 700 further comprises a support structure. The support structure holds multiple commutated flux stator sections 701 into place. In an exemplary embodiment, the support structure comprises several sections configured to hold the magnets and flux concentrators. Commutated flux stator sections 701 may be partitioned using spacers, for example portions of the support structure. The spacers may be configured to provide proper alignment of the multiple commutated flux stator sections 701. In an exemplary embodiment, the spacers are approximately as thick as a magnet in commutated flux stator sections 701. Moreover, the spacers may have any suitable thickness, as desired.

In various exemplary embodiments, the number of commutated flux stator sections 701 in gapped stator system 700 may range from 2 to 360 or more. The arc length of the multiple commutated flux stator sections 701 is less than the circumference of rotor 750. As defined herein, the arc length of multiple commutated flux stator sections 701 is the encompassed distance of rotor 750, not including the gap distance. In various exemplary embodiments, the total arc length of multiple commutated flux stator sections 701 is in the range of about 1% to about 95% of the circumference of rotor 750. In one embodiment, multiple commutated flux stator sections 701 are equally distributed about rotor 750 to form a substantially circumferential stator. In another embodiment, multiple commutated flux stator sections 701 are unequally distributed about rotor 750. For example, multiple commutated flux stator sections 701 may be located on only half of the circumference of rotor 750.

In another example, multiple commutated flux stator sections 701 are configured with uneven distances between each section. However, in an AC synchronous embodiment, multiple commutated flux stator sections 701 are typically located such that the switching portions of rotor 750 can magnetically engage each of multiple commutated flux stator sections 701. This can be accomplished, for example, by designing the distance between multiple commutated flux stator sections 701 to be a multiple of the distance between the switching elements of rotor 750.

In an exemplary embodiment, first magnet 711 has an outer edge parallel to, and opposite of, the interface between first magnet 711 and flux concentrator 712. Similarly, in the exemplary embodiment, second magnet 713 has an outer edge parallel to, and opposite of, the interface between second magnet 713 and flux concentrator 712. Stated another way, commutated flux stator section 701, in one embodiment, is "square" with respect to coil 720. In an exemplary embodiment, a "square" commutated flux stator section 701 facilitates manufacturing and assembly. In a modular approach, each commutated flux stator section 701 is manufactured with substantially flush inner cavities instead of rounded inner cavities. However, magnets 711, 713 and/or flux concentrator 712 can also be angled. For example, magnets 711, 713 might have a narrow first leg in comparison to the second leg, creating a tapered shape. Furthermore, flux concentrator 712 can also be tapered towards the axis of rotation of rotor 750. Moreover, magnets 711, 712 and/or flux concentrators 712 may be shaped, sized, and/or otherwise configured in any suitable manner, for example to achieve a desired torque density, output voltage waveform, and/or the like.

An advantage of a gapped stator configuration compared to a similar circumferential stator configuration is a decrease in weight. Another advantage is a decrease in the amount of magnetic material. Less magnetic material can result in a less expensive system. A decrease is weight is an advantage in various applications where a lower power is sufficient but extra weight is undesirable, for example due to structural stress.

In an exemplary embodiment, gaps 702 between commutated flux stator sections 701 are configured to provide ventilation for cooling. In other exemplary embodiments, various heat extraction devices such as heat sinks, other heat dispersive materials, fan blades, and/or other suitable devices may be added to and/or placed at least partially within gaps 702 between commutated flux stator sections 701.

Furthermore, in addition to cooling devices, other devices may be located in gaps 702 between commutated flux stator sections 701. In an exemplary embodiment, one or more measuring devices are located in gaps 702. The measuring devices, for example, may include devices to measure RPM, magnetic field strength, efficiency of the system, and/or the like.

Another advantage of gapped stator CFM system 700 is generally directed to assembly and/or repair of the stator. In an exemplary embodiment, commutated flux stator sections 701 are modular. Moreover, sections 701 may be separately removable and/or removable in multiple groups. Such a modular approach to assembly and/or disassembly results in easier replacement, as the removal and replacement of a section does not necessitate removing additional sections.

Also, the presence of gaps 702 enables a more forgiving manufacturing tolerance for gapped stator CFM system 700. For example, when alternating magnets and flux conducting elements are repeatedly stacked together, manufacturing tolerance variations can be cumulative, leading to magnets and/or flux conducting elements that are out of a desired alignment. By utilizing one or more gaps 702, the location of magnets and/or flux conducting elements can be periodically re-zeroed, eliminating tolerance stackup. As can be appreciated, less precisely manufactured components may thus be effectively utilized, reducing the expense of the system. Furthermore, the dimensions of gaps 702 may also be a function of at least one of an on-center distance between poles in gapped stator CFM system 700, a switch thickness of rotor 750, or the number of poles in gapped stator CFM system 700.

In addition to gapped stators disclosed above, principles of the present disclosure also contemplate "partial" or "truncated" stators. In accordance with an exemplary embodiment, a partial stator system comprises a stator that forms less than 360° coverage of a disk-shaped and/or annular rotor. In an exemplary embodiment, and with reference to FIG. 8A, a partial stator system 800 comprises a partial stator 810 and a rotor 850. Partial stator system 800 may be a portion of a fully circumferential stator design. For example, partial stator 810 may be coupled to less than 25% of the circumference of rotor 850. In another embodiment, partial stator 810 is coupled to less than 50% of the circumference of rotor 850. Moreover, partial stator 810 may at least partially enclose a portion of the circumference of rotor 850, for example a portion in the range of 1%-95%. In various embodiments, the range may be from 1%-75%, 2%-66%, or 5%-33%. Furthermore, the relationship with partial stator 810 and rotor 850 may be described in terms of relative arc lengths. For example, partial stator 810 may have an arc length less than 25% of the arc length of rotor 850.

Figure 2B:
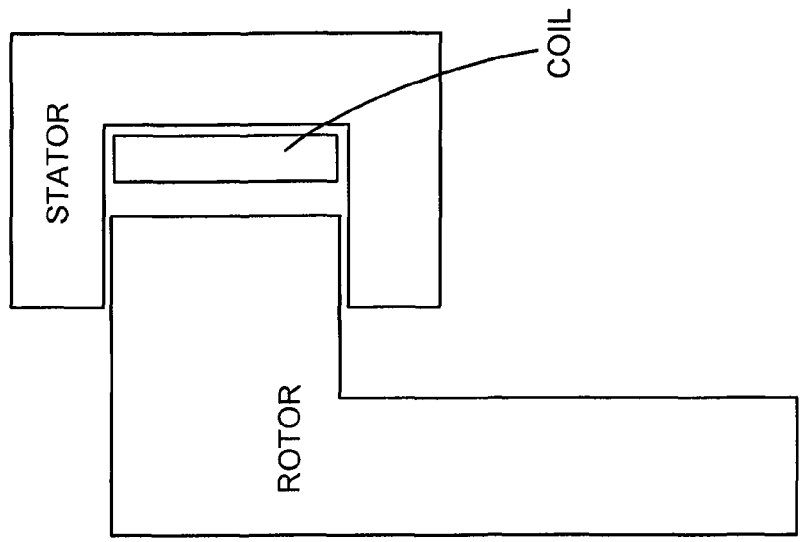
FIG. 2B illustrates an exemplary radial gap configuration in accordance with an exemplary embodiment.
Figure 2A:
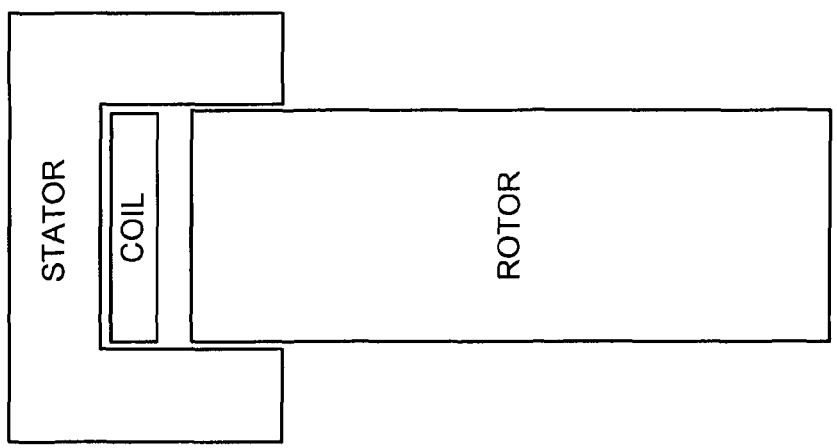
FIG. 2A illustrates an exemplary axial gap configuration in accordance with an exemplary embodiment.

In an exemplary embodiment and as illustrated in FIGS. 8B and 8C, a partial stator system 800 can also comprise gapped stator sections as previously described. In an exemplary embodiment, partial stator system 800 is an axial gap configuration, as shown in FIG. 2A. In another exemplary embodiment, partial stator system 800 is a radial gap configuration, as shown in FIG. 2B.

In various exemplary embodiments, partial stator system 800 is configured with an engagement between stator 810 and rotor 850. This engagement can be utilized for different purposes. For example, the engagement can be tailored for different sized rotors and/or different shaped rotors. Furthermore, in an exemplary embodiment the engagement is designed for at least one of: tailoring a voltage constant, tailoring a torque constant, tailoring a power density, or optimizing voltage and/or torque density for a specific application, and/or the like. Moreover, if partial stator system 800 comprises multiple stator sections, any particular stator section may be individually adjusted, for example for one of reasons set forth above.

Moreover, multiple partial stator sections may desirably be utilized, for example, in order to product polyphase output and/or respond to polyphase input. In various exemplary embodiments, multiple partial stator sections may be utilized, each corresponding to a different phase. However, any combination of partial stator sections and/or phases may be utilized, as desired.

In general, partial stator system 800 may be desirably utilized if an application requires less than the maximum power obtainable with a fully circumferential stator. In an exemplary embodiment, a number of commutated flux stator sections in partial stator system 800 can be customized to an application's requirements, for example a desired power output, efficiency, expense, and/or the like. In an exemplary embodiment, partial stator system 800 is designed based in part on a ratio between desired electrical output and the mass of system 800. Partial stator system 800 may also be designed in part based on the ratio between a rotor diameter and either of the electrical output or weight of system 800. In an exemplary embodiment, partial stator system 800 achieves more torque without increasing the amount of the stator material by increasing the diameter of the rotor.

Such applications may include bikes, scooters, washing machines, motorcycles, portable generators, power tools, and/or small engine applications. Partial stators may offer many and/or all of the benefits of gapped stators as discussed above. Moreover, partial stator system 800 may provide improved serviceability, for example because the stator components are more accessible and/or easier to assemble/disassemble compared to a fully circumferential stator.

Figure 9A:
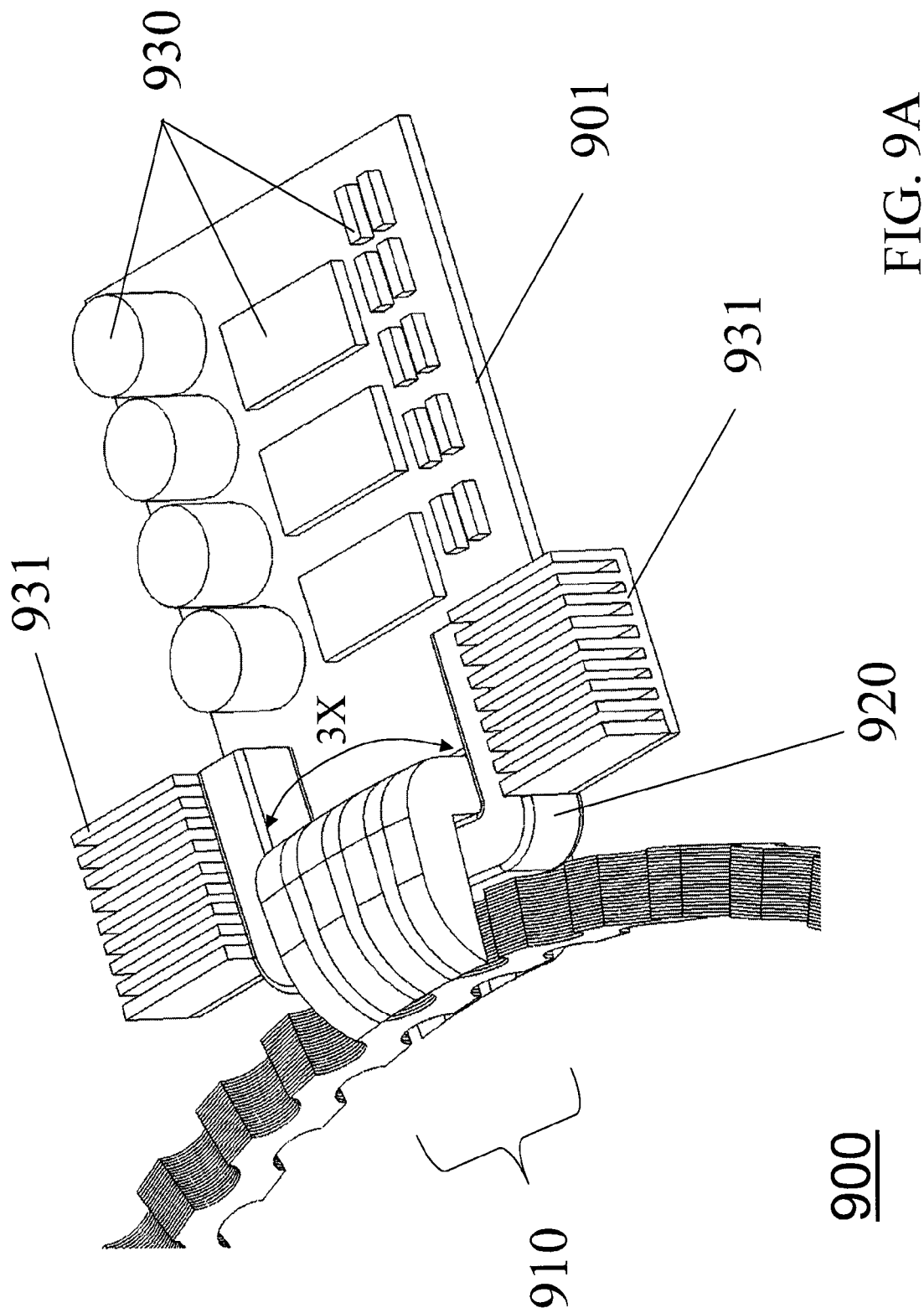
FIGS. 9A-9C illustrate exemplary partial stators and truncated coils coupled to an exemplary electronics board in accordance with an exemplary embodiment.

Partial and/or gapped stators may be coupled to other components, for example control electronics. In an exemplary embodiment and, with reference to FIG. 9A, a partial stator system 900 further comprises an electronics board 901 to capture the generated output from a coil 920. In another exemplary embodiment, electronics board 901 can be configured to provide power to partial stator system 900, for example delivering power to drive a rotor. Furthermore, in an exemplary embodiment, partial stator system 900 may be implemented within a commutated flux machine and/or a transverse flux machine. In one exemplary embodiment, a partial stator 910 is electrically connected to a truncated coil 920 that is mounted directly to electronics board 901. Electronics board 901 may, in an exemplary embodiment, include various electronic components 930. In an exemplary embodiment, electronic components 930 include integrated circuits, capacitors, invertors, and other suitable components, as desired.

Furthermore, in an exemplary embodiment, electronics board 901 is located a short distance from partial stator 910, and thus the length of truncated coil 920 from partial stator 910 to electronics board 901 is also short. In an exemplary embodiment, the length of truncated coil 920 from partial stator 910 to electronics board 901 is 1 inch or less. In another embodiment, the length of truncated coil 920 from partial stator 910 to electronics board 901 is in the range of 1-2 inches. Moreover, the length of truncated coil 920 may be any suitable length; however, the length of truncated coil 920 may often be desirably minimized to reduce resistive and/or other losses.

In accordance with an exemplary embodiment, a thickness to length ratio of truncated coil 920 is configured to permit a significant percentage of heat generated in truncated coil 920 to be removed conductively. In an exemplary embodiment, a significant percentage may be 70% or more of the generated heat. In various exemplary embodiments, a significant percentage may be between about 40% of the generated heat and 95% of the generated heat. With the appropriate physical dimensions and/or material properties, in an exemplary embodiment, truncated coil 920 can significantly cool itself conductively. In an exemplary embodiment, the ratio of the length of truncated coil 920 to the thickness of truncated coil 920 is about 20:1. In various exemplary embodiments, the ratio may be between about 10:1 to about 75:1. Moreover, the ratio may be any suitable ratio configured to allow truncated coil 920 to conductively transfer a suitable amount of heat, for example heat generated within the portion of truncated coil 920 at least partially enclosed by truncated stator 910.

Moreover, additional components, for example cooling components 931, may be coupled directly to coil 920. In an exemplary embodiment, cooling components 931 may utilize at least one of radiant, convective, or conductive cooling. Cooling components 931 may also be formed from and/or comprise a portion of coil 920. In this manner, thermal energy transferred from coil 920 to electronics board 901 may be reduced. Moreover, a rotor coupled to partial stator system 900 generally cools more effectively than a rotor in a fully circumferential stator system. This is due at least in part to the rotor only conducting flux in a portion of the rotation, which results in less heating of the rotor, also provides time for the rotor to cool when not conducting flux.

Furthermore, in various exemplary embodiments, truncated coil 920 is configured with minimal end turn material and/or no end turn material. An end turn may be considered to be a portion of a coil that is not linked by substantial flux. In other words, the portion of the coil that is not coupled to a flux concentrator and/or magnets may be considered to be an end turn. In general, end turns are undesirable because they incur coil losses without doing useful work. For example, an end turn of a traditional motor incurs large losses as current flows through an end turn coil portion. Coil losses may include resistive losses, eddy current losses, thermal losses, and/or other coil losses associated with a given coil mass and/or configuration. Furthermore, heating of the coil due to resistance is also reduced if using less coil material. In one embodiment, truncated coil 920 comprises a monolithic material core. Moreover, truncated coil 920 may comprise any suitable material, for example layered, laminated, and/or otherwise shaped and/or formed material, as desired.

Figure 9B:
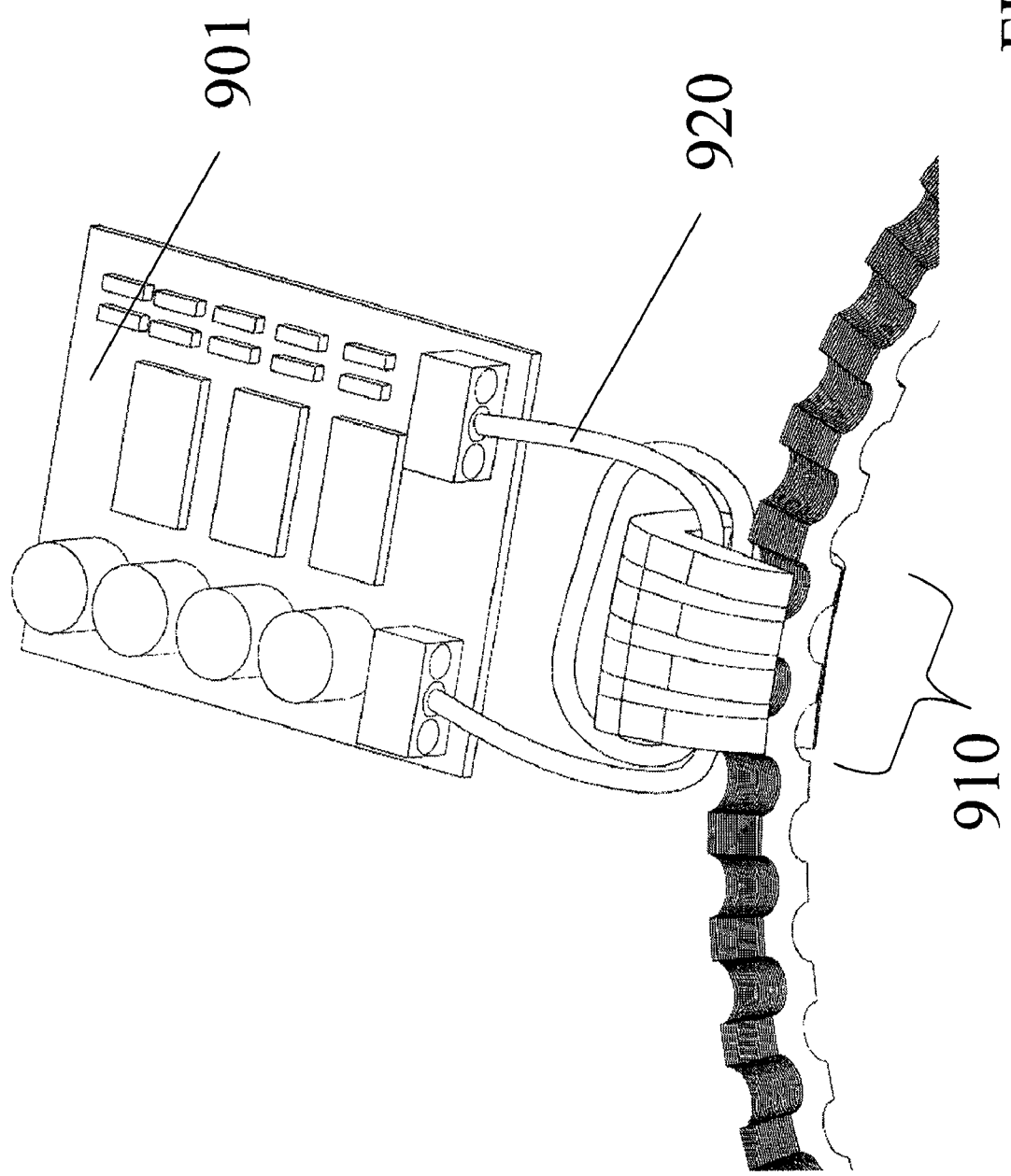
Figure 9C:
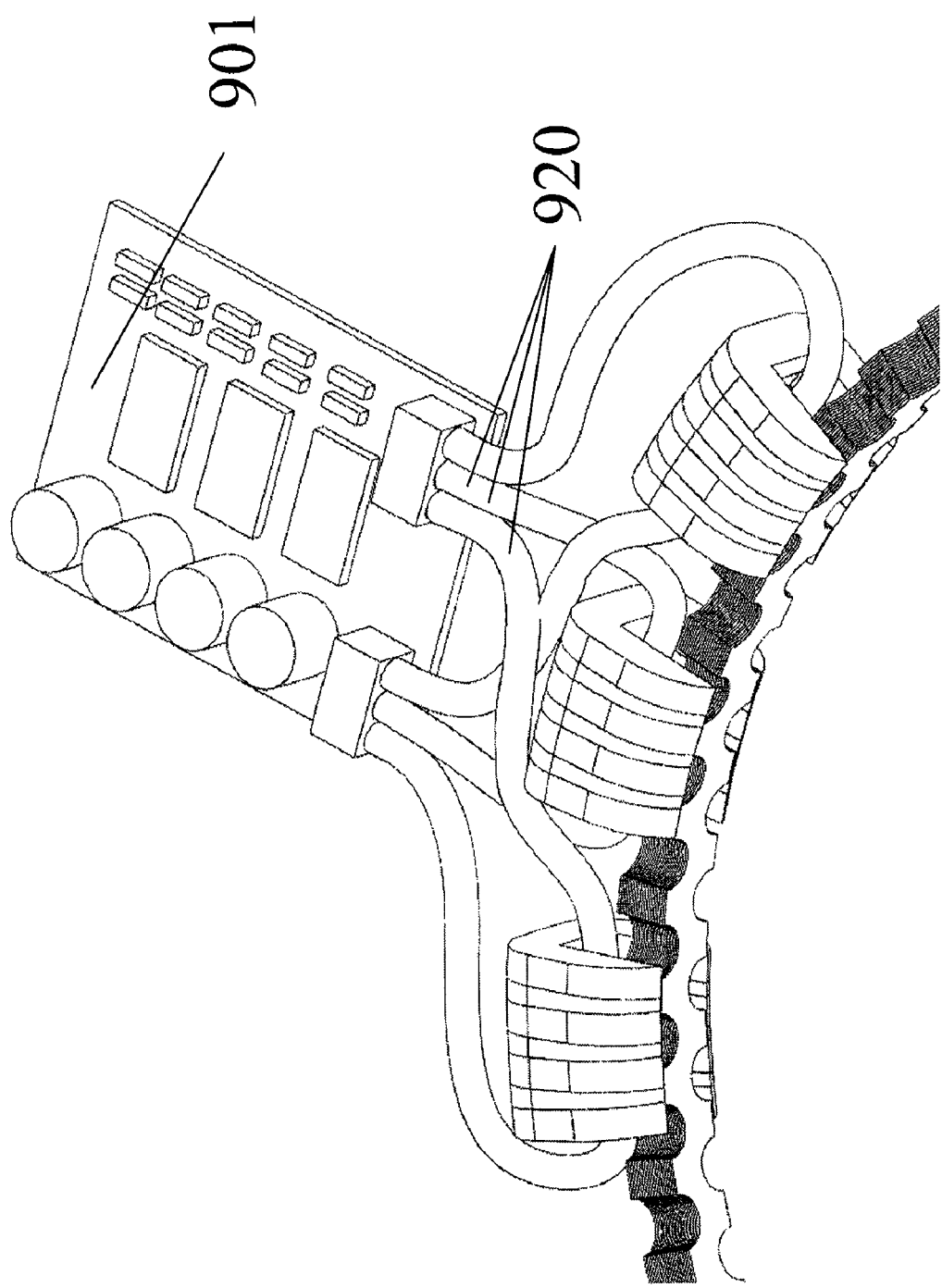

In various exemplary embodiments, multiple commutated flux stator sections each have a corresponding truncated coil 920 in a single winding configuration, which can be connected to a single electronics board 901 (see, e.g., FIG. 9C). In other exemplary embodiments, truncated coil 920 comprises a double winding and/or more windings (see, e.g., FIG. 9B).

Figure 10A:
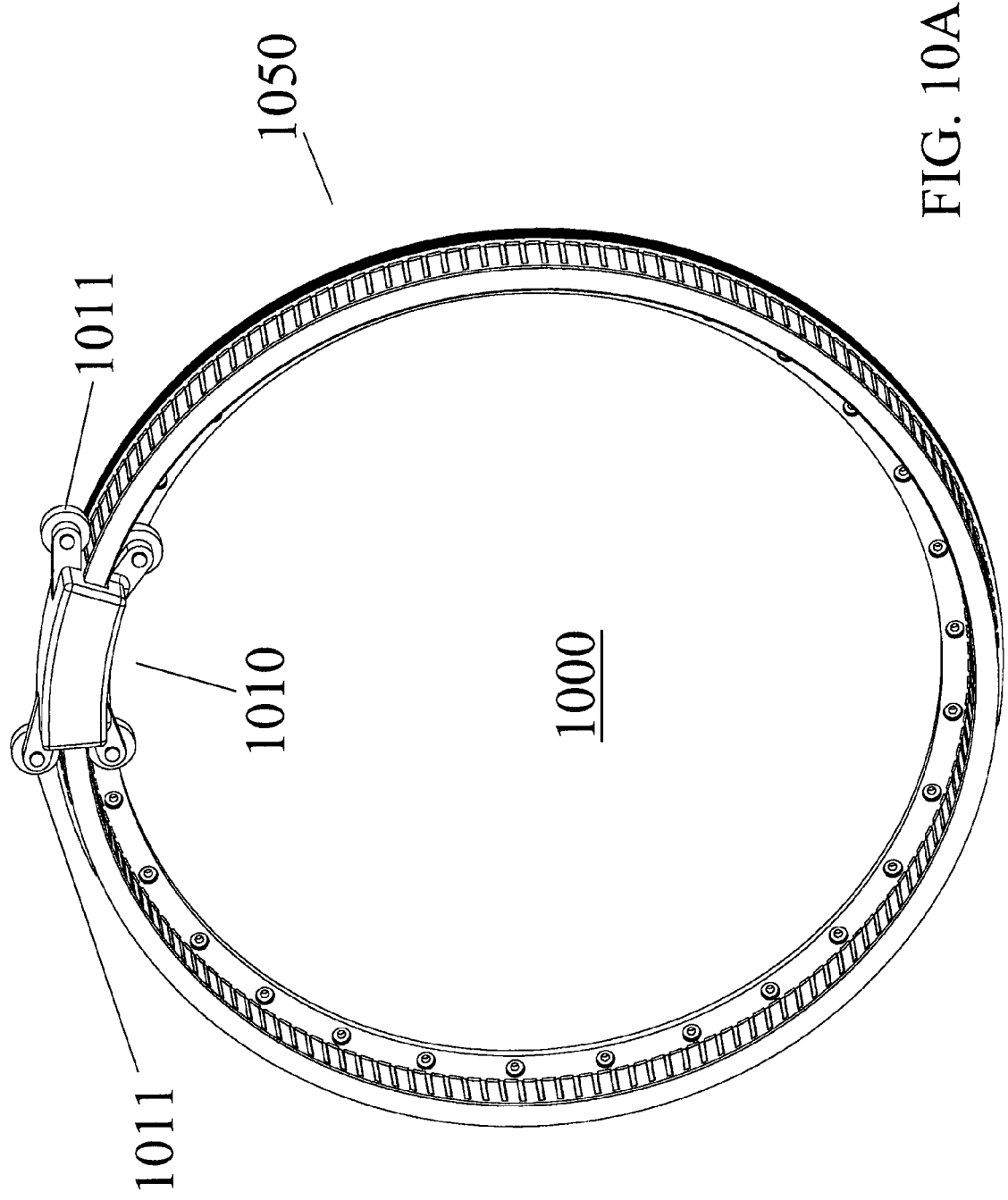
FIGS. 10A-10B illustrate an exemplary floating stator in accordance with an exemplary embodiment.
Figure 10B:
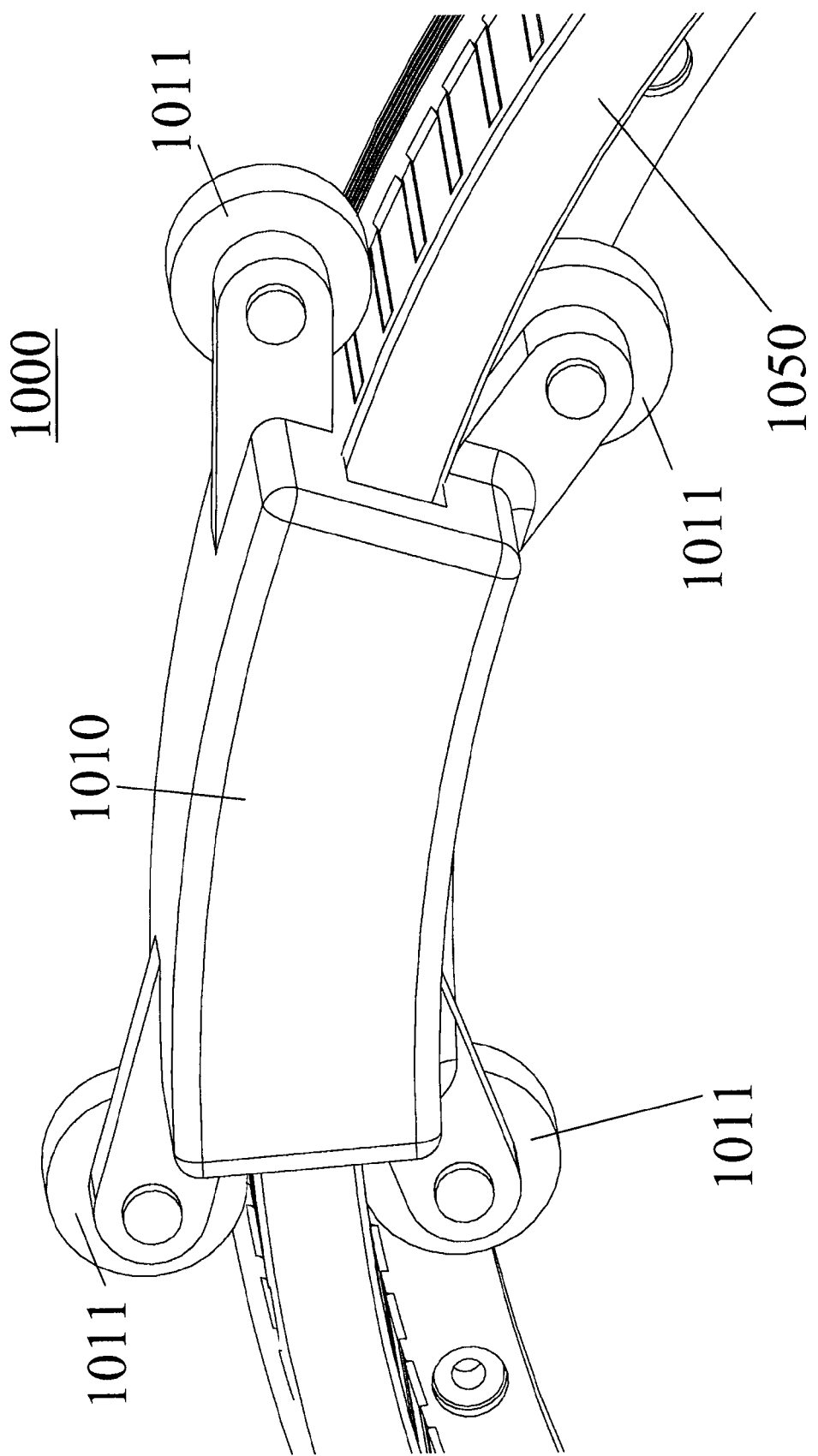

In addition to partial and/or gapped stators, principles of the present disclosure contemplate "floating" stators. As used herein, a "floating" stator may be a stator configured to be at least partially adjustable and/or moveable with respect to a rotor, for example in order to maintain a desired air gap. With reference now to FIGS. 10A and 10B, in an exemplary embodiment a floating stator system 1000 comprises a partial stator 1010, a rotor 1050, and one or more guide mechanisms 1011. Rotor 1050 may be attached to another object and held in place, and stator 1010 may be capable of floating. Alternatively, stator 1010 may be attached to another object and held in place, and rotor 1050 may be capable of floating.

In an exemplary embodiment, guide mechanisms 1011 are configured to help align rotor 1050 and/or mechanically facilitate a size of an air gap between rotor 1050 and partial stator 1010. Prior systems were often unable to achieve a targeted air gap as the diameter of the rotor increased. For example, many motors and/or generators are configured with an air gap no smaller than $1/250$ of the diameter of the rotor, in order to prevent the rotor and stator from contacting and/or damaging one another. This is generally due to manufacturing tolerances and/or other difficulties, for example the difficulty of producing perfectly round components.

In contrast, via use of a floating stator 1010, floating stator system 1000 can be configured with an air gap independent of the diameter of a rotor. For example, in an exemplary embodiment, floating stator system 1000 is configured with a rotor diameter of 36 inches. This floating stator system 1000 may also be configured with an air gap of only 0.036 inches. In contrast, prior motors and/or generators having a similar rotor diameter were often configured with an air gap no smaller than 0.144 inches (i.e., an air gap no small than $1/250$ of the diameter of the rotor). By decoupling selecting an air gap from a corresponding rotor diameter, commutated and/or transverse flux systems having large rotor diameters (and corresponding high torque) may be configured with narrow air gaps, improving the performance of the system. Stated another way, floating stator 1010 is capable of adjusting to gradual deviations in the diameter of the rotor.

Guide mechanisms 1011 may be at least one of wheels, rails, bearings, bumpers, spacers, lubricious material, and/or the like. Moreover, guide mechanisms may be any suitable device configured to direct, guide, and/or align rotor 1050 and partial stator 1010. In various exemplary embodiments, guide mechanisms 1011 also function to help clean off debris from rotor 1050. In these embodiments, guide mechanisms 1011 further comprise at least one of brushes, air or gas jets, wipers, or magnetic pick-up wipers to deflect magnetic debris. Moreover, guide mechanisms 1011 may comprise any suitable mechanism for clearing debris from rotor 1050.

Floating rotors can improve device manufacturing tolerances, ease of manufacturing, and robustness of overall design. Moreover, in an exemplary embodiment, a floating rotor further comprises a hubless design, such that the rotor is not connected to a central hub. In this manner, increased space in the middle of the rotor is provided. Moreover, such a hubless design can increase heat dissipation capabilities, for example by providing additional room for cooling airflow.

Furthermore, a hubless design may be configured to increase the floating capabilities of the rotor and/or stator, and/or to allow more tolerance within the system. Such increased floating and/or tolerance may be useful in flux machines that undergo sudden changes of direction, for example when installed in a vehicle. For example, in a vehicle, turning may increase a chance of a rotor and stator scraping, due to the angular momentum of the system. Moreover, in a vehicle, a rotor and stator may scrape and/or otherwise contact one another in an undesirable manner for various reasons, for example contact with a pothole, lateral acceleration during a turn, an external force, and/or the like. A hubless design may be configured to prevent rotor/stator contact resulting from any and/or all of the foregoing.

Suitable methods of forming and/or materials for stators, rotors, coils, switches, flux concentrators, and/or other flux conducting components of transverse and/or commutated flux machines may be found in co-pending U.S. patent application entitled "TRANSVERSE AND/OR COMMUTATED FLUX SYSTEM ROTOR CONCEPTS" having the same filing date as the present application. Principles of the present disclosure may suitably be combined therewith.

Principles of the present disclosure may also suitably be combined with principles for rotors in transverse flux machines and/or commutated flux machines as disclosed in a co-pending U.S. patent application entitled "TRANSVERSE AND/OR COMMUTATED FLUX SYSTEM ROTOR CONCEPTS" having the same filing date as the present application, the contents of which are hereby incorporated by reference in their entirety.

Principles of the present disclosure may also suitably be combined with principles of polyphase transverse flux machines and/or polyphase commutated flux machines as disclosed in a co-pending U.S. patent application entitled "POLYPHASE TRANSVERSE AND/OR COMMUTATED FLUX SYSTEMS" having the same filing date as the present application, the contents of which are hereby incorporated by reference in their entirety.

Moreover, principles of the present disclosure may suitably be combined with any number of principles disclosed in any one of and/or all of the co-pending U.S. patent applications incorporated by reference herein. Thus, for example, a particular commutated flux machine may incorporate use of a partial stator, use of a tape wound rotor, use of a polyphase design, and/or the like. All such combinations, permutations, and/or other interrelationships are considered to be within the scope of the present disclosure.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, the invention has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

STATEMENT OF INVENTION

A commutated flux stator section, comprising a flux concentrator, a first magnet connected to a first side of the flux concentrator and having an outer edge parallel to, and opposite of, the interface between the first magnet and the flux concentrator, and a second magnet connected to a second side of the flux concentrator opposite the first side. The second magnet may have an outer edge parallel to, and opposite of, the interface between the second magnet and the flux concentrator. The first magnet and the second magnet may be magnetically oriented such that a common magnetic pole is present on the first and second sides of the flux concentrator. The commutated flux stator section may partially enclose a radial section of a coil. The distance between the outer edges of the first and second magnet may be substantially equal throughout the commutated flux stator section partially enclosing the coil. The outer edge of the first magnet may be parallel to the outer edge of the second magnet. The first magnet and the second magnet may have the same thickness. The commutated flux stator section may comprise part of a commutated flux machine having an axis of rotation, and the commutated flux stator section may be tapered towards the axis of rotation. The first magnet, the second magnet, and the flux concentrator may be individually tapered towards the axis of rotation.

A commutated flux stator section comprising a plurality of commutated flux stator sections assembled at least partially about the circumference of a rotor, wherein the arc length of the plurality of commutated flux stator sections is less than the circumference of the rotor. A gap may be located between each of the plurality of commutated flux stator sections. A supporting structure may be located between one or more of the plurality of commutated flux stator sections. A tolerancing space may be located between at least two of the plurality of commutated flux stator sections. The tolerancing space may be configured to facilitate assembly of a commutated flux machine. The width of the tolerancing space may be a function of at least one of: a manufacturing tolerance, an on-center distance between poles in the commutated flux machine, a switch thickness of the rotor, or the number of poles in the commutated flux machine. The total arc length of the plurality of commutated flux stator sections may be in the range of about 1% to about 95% of the circumference of the rotor. A first subset of the plurality of commutated flux stator sections may each comprise a flux concentrator having a first polarity. A remaining subset of the plurality of commutated flux stator sections may each comprise a flux concentrator having a second polarity opposite the first polarity. The rotor may be a multipath rotor.

What is claimed is:

1. A commutated flux machine, comprising:
    a truncated stator comprising a plurality of magnets interleaved with a plurality of flux concentrators,
    wherein the plurality of magnets have alternating magnetic orientation such that the plurality of flux concentrators have alternating magnetic poles, and
    wherein the plurality of magnets and the plurality of flux concentrators are coupled to less than the full circumference of a rotor.

2. The commutated flux machine of claim 1, wherein the truncated stator is associated with a portion of the rotor, wherein the portion of the rotor is less than 25% of the circumference of the rotor, and wherein at least 75% of the circumference of the rotor is not engaged by the truncated stator.

3. The commutated flux machine of claim 2, wherein the portion of the rotor not engaged by the truncated stator is contiguous.

4. The commutated flux machine of claim 1, wherein the truncated stator is associated with a portion of the rotor, wherein the portion of the rotor is less than 50% of the circumference of the rotor, and wherein at least 50% of the circumference of the rotor is not engaged by the truncated stator.

5. The commutated flux machine of claim 1, wherein the rotor comprises a plurality of flux switches, and wherein the plurality of flux switches simultaneously couple at least two north poles in the plurality of flux concentrators to at least two south poles in the plurality of flux concentrators.

6. The commutated flux machine of claim 1, wherein the commutated flux machine is configured to increase torque by increasing the diameter of the rotor while maintaining the mass of the plurality of magnets and the plurality of flux concentrators in the truncated stator.

* * * * *